US008184590B2

(12) United States Patent
Rosenblatt

(10) Patent No.: US 8,184,590 B2
(45) Date of Patent: May 22, 2012

(54) METHOD AND SYSTEM FOR HANDOFF BETWEEN WIRELESS NETWORKS

(75) Inventor: Ariel Rosenblatt, Pincourt (CA)

(73) Assignee: CounterPath Technologies Inc., Vancouver, British Columbia (CA)

( * ) Notice: Subject to any disclaimer, the term of this patent is extended or adjusted under 35 U.S.C. 154(b) by 1181 days.

(21) Appl. No.: 11/832,928

(22) Filed: Aug. 2, 2007

(65) Prior Publication Data

US 2009/0034471 A1    Feb. 5, 2009

(51) Int. Cl.
*H04W 4/00* (2009.01)
*H04J 3/00* (2006.01)
*H04J 3/16* (2006.01)
*H04J 3/22* (2006.01)

(52) U.S. Cl. ........ 370/331; 370/334; 370/338; 370/466; 370/467

(58) Field of Classification Search .................. 370/331, 370/334, 338, 466, 467
See application file for complete search history.

(56) References Cited

U.S. PATENT DOCUMENTS

| 5,912,878 | A  | * | 6/1999  | Park et al. ..................... | 370/229 |
| 2003/0224795 | A1 |   | 12/2003 | Wilhoite et al. | |
| 2006/0276192 | A1 | * | 12/2006 | Dutta et al. ..................... | 455/436 |
| 2007/0047523 | A1 | * | 3/2007  | Jiang ............................. | 370/352 |
| 2007/0127415 | A1 | * | 6/2007  | Spear ............................ | 370/331 |
| 2007/0147391 | A1 |   | 6/2007  | Wilhoite et al. | |
| 2007/0220092 | A1 | * | 9/2007  | Heitzeberg et al. ........... | 709/204 |
| 2008/0037517 | A1 | * | 2/2008  | Emborg ........................ | 370/352 |
| 2009/0280810 | A1 | * | 11/2009 | Mahdi et al. .................. | 455/436 |

FOREIGN PATENT DOCUMENTS

| WO | 2005002250 A1 | 1/2005 |
| WO | 2006020168 A2 | 2/2006 |
| WO | 2007140582 A1 | 12/2007 |

OTHER PUBLICATIONS

Cardenete-Suriol et al., "VoIP Performance in SIP-based Vertical Handovers between WLAN and GPRS/UMTS Networks", IEEE International Conference on Communications (ICC '07), Jun. 24-28, 2007, pp. 1973-1978.
Kim et al., "Seamless Connection for Mobile P2P and Conventional Wireless Network", The 19th International Conference on Advanced Communication Technology, vol. 3, Feb. 12-14, 2007, pp. 1602-1605.
International Search Report and Written Opinion dated Nov. 14, 2008, from PCT/CA2008/001423.

* cited by examiner

*Primary Examiner* — Chi Pham
*Assistant Examiner* — Farah Faroul
(74) *Attorney, Agent, or Firm* — Anne Kinsman; Borden Ladner Gervais LLP

(57) ABSTRACT

A method and system for operating a standalone client in a dual-mode mobile communications device to hand off a call between first and second wireless networks operating under different communications protocols, using Session Initiation Protocol (SIP) and ISDN User Part (ISUP) signalling. The standalone client-side application, or handoff agent, directly controls handoff of the call to the second wireless network until at least one new media stream to connect the dual-mode mobile communications device to the second device is established over the second wireless network. The standalone client-side application solely originates and controls an exchange of messages at the application layer, the exchange of messages modifying the communications channel.

22 Claims, 23 Drawing Sheets

METHOD AND SYSTEM FOR HANDOFF BETWEEN WIRELESS NETWORKS

FIELD OF THE INVENTION

The present invention relates to the operation of dual-mode wireless communication devices. More particularly, the present invention relates to handoff of communications between wireless networks, such as between WiFi and cellular networks, using Session Initiation Protocol (SIP) and ISDN User Part (ISUP) messaging.

BACKGROUND OF THE INVENTION

Session Initiation Protocol (SIP), specified in the RFC 3261 of the Internet Engineering Task Force (IETF) SIP Working Group, is an application-layer control (signaling) protocol for creating, modifying, and terminating sessions with one or more participants, and is widely used as a signaling protocol for Voice over IP (VoIP). SIP sessions can be of different media types, including Internet Protocol (IP) telephone calls, instant messaging (IM), multimedia distribution, and multimedia conferences. SIP provides a signaling and call setup protocol for IP-based communications that can support many of the call processing functions and features present in the public switched telephone network (PSTN). SIP itself does not define these features. However, SIP permits such features to be built into network elements, such as proxy servers and user agents, and implementing these features permits familiar telephone-like operations, such as dialing a number, causing a phone to ring, and hearing ringback tones or a busy signal.

SIP works in concert with several other protocols and is only involved in the signaling portion of a communication session. SIP acts as a carrier for the Session Description Protocol (SDP), which describes the set up and media content of the session, such as the IP ports to use and the codec being used. SIP clients typically use Transmission Control Protocol (TCP) and User Datagram Protocol (UDP) to connect to SIP servers and other SIP endpoints. SIP is most commonly used to set up and tear down voice and video calls. However, it can be used in any application where session management is a requirement, such as event subscription and notification, and terminal mobility. All communications are done over separate session protocols, typically implementing Real-Time Transport Protocol (RTP).

SIP-enabled telephony networks can also implement many of the more advanced call processing features present in Signaling System 7 (SS7). However, while SS7 is a highly centralized protocol, characterized by complex central network architecture and unintelligent endpoints (conventional telephone handsets), SIP is a peer-to-peer protocol. SIP features are typically implemented in the communicating endpoints (i.e. at the edge of the network) as opposed to traditional SS7 features, which are implemented in the network.

Dual mode devices permit a user to roam between WiFi, or VoIP networks, and cellular networks, such as 2.5 G and 3.0 G cellular networks. Generally, to switch, or handoff, between the networks requires communication with an adjunct server associated with the user's home network to establish a new communication session with a visited network, and to implement and monitor the communication session for administrative reasons, such as available functionality, accounting and other purposes. In addition to the high communication overhead and time required to make such handoffs, maintaining and operating adjunct roaming servers is costly, and there are security concerns inherent in their operation. In addition, implementing changes to the service offerings or system functionality requires problematic changes at the server side.

It is, therefore, desirable to provide a client side method and system to handoff mobile communications between different wireless networks.

SUMMARY OF THE INVENTION

According to a first aspect of the invention, there is provided a method for operating a dual-mode mobile communications device to hand off a call between first and second wireless networks operating under different communications protocols. The method comprises establishing the call over the first wireless network between the dual-mode mobile communications device and a second device. This sets up initial communications channel between the dual-mode communications device and the second device. The initial communications channel comprises at least one VoIP and/or circuit-switched (CS) media stream. The dual-mode mobile communications device is then operated to detect a handoff condition for handing off the call between the first wireless network and the second wireless network. When such a condition is detected, the dual-mode device is operated to directly control the handoff of the call to the second network by executing a standalone client-side application on the dual-mode mobile communications device. The standalone client-side application invokes and controls an exchange of messages, such as sequences of Session Initiation Protocol (SIP) and ISDN User Part (ISUP) messages, to modify the communications channel until at least one new media stream connecting the dual-mode device to the second device over the second network is established.

According to a further aspect, the present invention provides a dual-mode mode communications device for roaming between first and second wireless networks operating under different communications protocols. A call is established over the first wireless network between the dual-mode mobile communications device and a second device, thereby setting up an initial communications channel between the dual-mode communications device and the second device. The initial communications channel comprises at least one media stream. The dual-mode communications device comprises a roaming agent and a handoff agent. The roaming agent detects a handoff condition for handing off the call between the first wireless network and the second wireless network. The handoff agent directly controls handoff of the call to the second network by invoking an exchange of messages to modify the communications channel until at least one new media stream, connecting the dual-mode device to the second device over the second network, is established.

According to presently preferred embodiments, when the second device is a SIP-enabled device, the first network is a WiFi network, the second network is a GSM network, and the initial communications channel comprises a Voice over IP (VoIP) media stream between the dual-mode mobile communications device and the SIP-enabled device, the modified communications channel comprises a circuit switched (CS) media stream between the dual-mode mobile communications device and a public switched telephone network (PSTN) gateway, and a hairpinned VoIP media stream between the PSTN gateway and the SIP-enabled device.

When the second device is a SIP-enabled device, the first network is a GSM network, the second network is a WiFi network, and the initial communications channel comprises a CS media stream between the dual-mode mobile communications device and a PSTN gateway and a hairpinning VoIP media stream between the PSTN gateway and the SIP-enabled device, the modified communications channel comprises a VoIP media stream between the dual-mode mobile communications device and the SIP-enabled device.

When the second device is a SIP-enabled device, the dual-mode mobile communications device is a class B/C device, the first network is a GSM network, the second network is a WiFi network, and the initial communications channel comprises a CS media stream between the dual-mode mobile communications device and a PSTN gateway and a hairpinned VoIP media stream between the PSTN gateway and the SIP-enabled device, the modified communications channel comprises a VoIP media stream between the dual-mode mobile communications device and the PSTN gateway, and the hairpinned VoIP media stream between the PSTN gateway and the SIP-enabled device.

According to further preferred embodiments, when the second device is a PSTN device, the first network is a WiFi network, the second network is a GSM network, and the initial communications channel comprises a VoIP media stream between the dual-mode mobile communications device and a public switched telephone network (PSTN) gateway and a CS media stream between the PSTN gateway and the PSTN device, the modified communications channel comprises a circuit switched (CS) media stream between the dual-mode mobile communications device and the PSTN gateway, and the CS media stream between the PSTN gateway and the PSTN device.

When the second device is a PSTN device, the first network is a GSM network, the second network is a WiFi network, and the initial communications channel comprises a CS media stream between the dual-mode mobile communications device and a PSTN gateway and a further CS media stream between the PSTN gateway and the PSTN device, the modified communications channel comprises a VoIP media stream between the dual-mode mobile communications device and the PSTN gateway, and the further CS media stream between the PSTN gateway and the PSTN device.

When the second device is a PSTN device, the dual-mode mobile communications device is a class B/C device, the first network is a GSM network, the second network is a WiFi network, and the initial communications channel comprises a CS media stream between the dual-mode mobile communications device and a PSTN gateway and a further CS media stream between the PSTN gateway and the PSTN device, the modified communications channel comprises a VoIP media stream between the dual-mode mobile communications device and the PSTN gateway, and the further CS media stream between the PSTN gateway and the PSTN device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention is to a method and system for operating a standalone client in a dual-mode mobile communications device to hand off a call between first and second wireless networks operating under different communications protocols.

Figure 1:
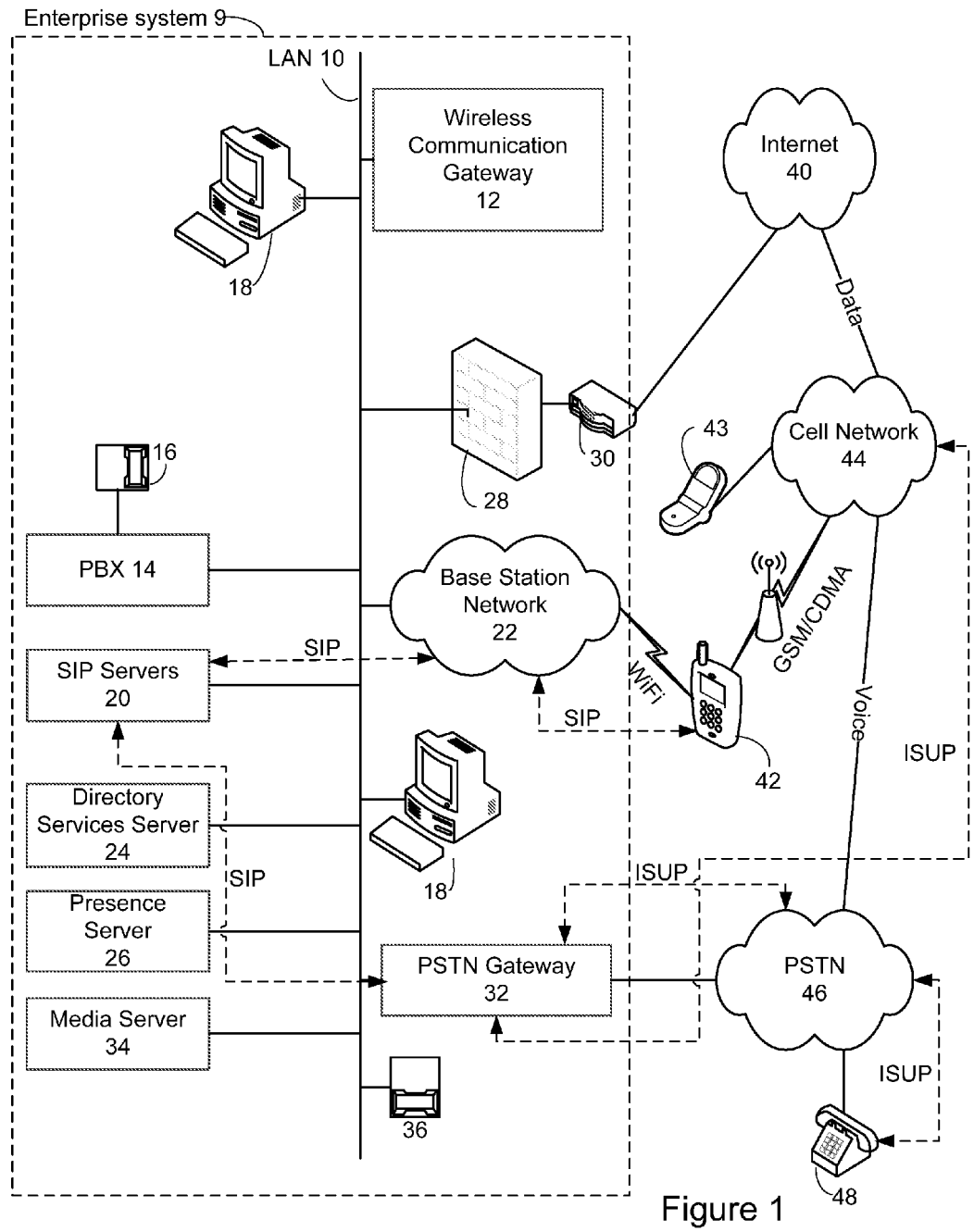
FIG. 1 shows an exemplary system architecture according to an embodiment of the present invention.

Referring to FIG. 1, an exemplary enterprise architecture for an enterprise implementing Voice over IP (VoIP) communications over a Wireless Local Area Network (WLAN), such as a WiFi network, is shown. The system 9 is shown with connections to public networks, such as a public switched telephone network (PSTN) and the Internet. The system architecture is intended to be exemplary only, and the actual system architecture will depend on the services and functionality desired by the enterprise. Typically, the system hardware will be housed in a single building, but distributed architectures are equally contemplated and encompassed by the present invention. The illustrated enterprise hardware comprises a Local Area Network (LAN) 10 to which is connected a wireless communication gateway 12, an Internet Protocol Private Branch Exchange (IP PBX) 14, telephones 16, workstations 18 which may optionally be running SIP softphones, SIP servers 20, a base station network 22, a directory services server 24, a presence server 26, a firewall 28 and router 30, a PSTN gateway 32, a media server 34, and SIP telephones 36. While shown as separate and distinct devices, the various components of the enterprise system can be integrated in many ways, as is well known in the art. For example two or more of the server functions can be integrated into a single device, or can be integrated into the PBX 14.

The PBX 14 is connected to the SIP servers 20 over the LAN 10, and communicates with the SIP servers 20 using SIP. SIP servers are proxy servers that route requests to the user's current location, authenticate and authorize users for services, implement provider call-routing policies, and provide features to users. SIP also provides a registration function (REGISTER) that allows users to upload their current location for use by proxy servers. The PBX 14 is connected to telephones 16 via conventional circuit-switched connections. The PBX 14 can be connected to the PSTN 46 via the PSTN gateway 32 as shown, or it can be directly connected. The SIP servers 20 are connected to the SIP telephones 36 and the PSTN gateway 32 via the LAN 10. The PSTN gateway 32 translates SIP into various PSTN protocols, as is well known.

The wireless communication gateway 12 communicates with the SIP servers 20 using SIP via the LAN 10. The wireless communication gateway 12 is also connected to the Internet 40 through the LAN 10 and the firewall/router 28/30. The directory services server 24, presence server 26 and media server 34 are all accessible to the wireless communication gateway 12 via the LAN 10. The directory services server 24 can, for example, use Lightweight Directory Access Protocol (LDAP) to communicate with the wireless communication gateway 12. The presence server 26 can, for example, use SIP Instant Messaging and Presence Leveraging Extensions (SIMPLE) to communicate with the wireless communication gateway 12. SIMPLE can carry presence information, conveying a user's willingness and ability to engage in communications. The media server 34 can, for example, use SIP to communicate, and is connected to the PSTN gateway 32, the wireless communication gateway 12 and SIP servers 20 via the LAN 10. The media server 34 provides interactive voice response (IVR) and conferencing functionality. Media servers, or gateways, typically offer conferencing functionality, play and record functionality, speech recognition, and text-to-speech translation.

Wireless mobile communication devices, such as 2.5 G and 3 G cellular devices, WiFi devices and dual mode Global System for Mobile Communications (GSM) and code division multiple access (CDMA) devices can connect to the enterprise system 9 via the base station network 22. The base station network 22 typically includes an access point, such as a WiFi access point (not shown), and an access router (not shown), to receive and transmit data packets, and, in conjunction with the SIP server(s) 20, to enable SIP communications. Dual mode devices, such as illustrated dual mode device 42, provide dual-mode connectivity to both the base station network 22 via WiFi, and the cellular network 44 via GSM/GPRS (General Packet Radio Services) or CDMA. The cellular network 44 connects to the PSTN 46 and the Internet 40. Voice calls from the dual mode device 42, or other cellular device 43, can travel from the cell network to the PSTN via trunk or digital lines, and data packets can travel from the cell network to the Internet. WiFi devices in range can communicate directly with base station network 22. External voice telephones 48 can also connect to the PSTN 46 via trunk or digital lines, and hence to the enterprise system.

As shown in FIG. 1, the system has access to both data and voice networks. The data network can include one or more LANs connected to a Wide Area Network (WAN). The voice network can communicate over both conventional circuit switched (CS) nodes and VoIP nodes, which utilize the data network. The voice network can span both the enterprise domain and the public domain. Devices and boxes connected to the data network, such as phones, servers, gateways, base stations, desktops, and VoIP devices, typically store a unique network address, such as an IP address, in memory. Data packets can be routed to the device at the stored address. Devices connected to the circuit switched (CS) voice network use standard telephony addressing, such as telephone numbers and extensions. They are connected with standard interfaces, such as T1 trunks and digital lines. As shown by the dotted arrows, communications between the PSTN gateway 32, PSTN 46, telephone 48 and cell network 44 are set up using ISUP (ISDN User Part) messaging. Communications between the PSTN gateway 32, the SIP server 20, the base station network 22 and the dual-mode communication device 42 are set up using SIP.

Typically, when the dual mode device 42 is in range of the WiFi base station network 22, it will operate in WiFi mode, so that it can access the full range of functionality provided by its enterprise. Handoff to a cellular network (or vice versa) can be triggered either manually, or automatically when the WiFi signal is lost or becomes significantly weakened, as is well known in the art.

In the following, expressions relating to "intelligent agents" or "agents" will be used. These expressions are well known in the art of computer science. An agent is a complex software entity that is capable of acting with a certain degree of autonomy in order to accomplish tasks on behalf of its user. An agent is essentially a software entity defined in terms of its behavior. An agent's behaviour can be defined in terms of such concepts as: persistence (code is not executed on demand but runs continuously and decides for itself when it should perform some activity); autonomy (agents have capabilities of task selection, prioritization, goal-directed behavior, decision-making without human intervention); social ability (agents are able to engage other components through some sort of communication and coordination, they may collaborate on a task); and, reactivity (agents perceive the context in which they operate and react to it appropriately). As used herein, agents and other software-enabled functional blocks are executed on a suitable general purpose computer, server, or other device having a microprocessor running on known operating systems such as, for example, Linux or Windows, and have access to memory and data through any suitable means. Intelligent agents have the ability to adapt and to learn. Adaptation implies sensing the environment and reconfiguring in response. This can be achieved through the choice of alternative problem solving rules or algorithms, or through the discovery of problem solving strategies. Adaptation may also include other aspects of an agent's internal construction, such as recruiting processor or storage resources. Learning, on the other hand, may proceed through trial-and-error. This implies a capability of introspection and analysis of behavior and success. Alternatively, learning may proceed by example and generalization, which implies a capacity to abstract and generalize.

Figure 2:
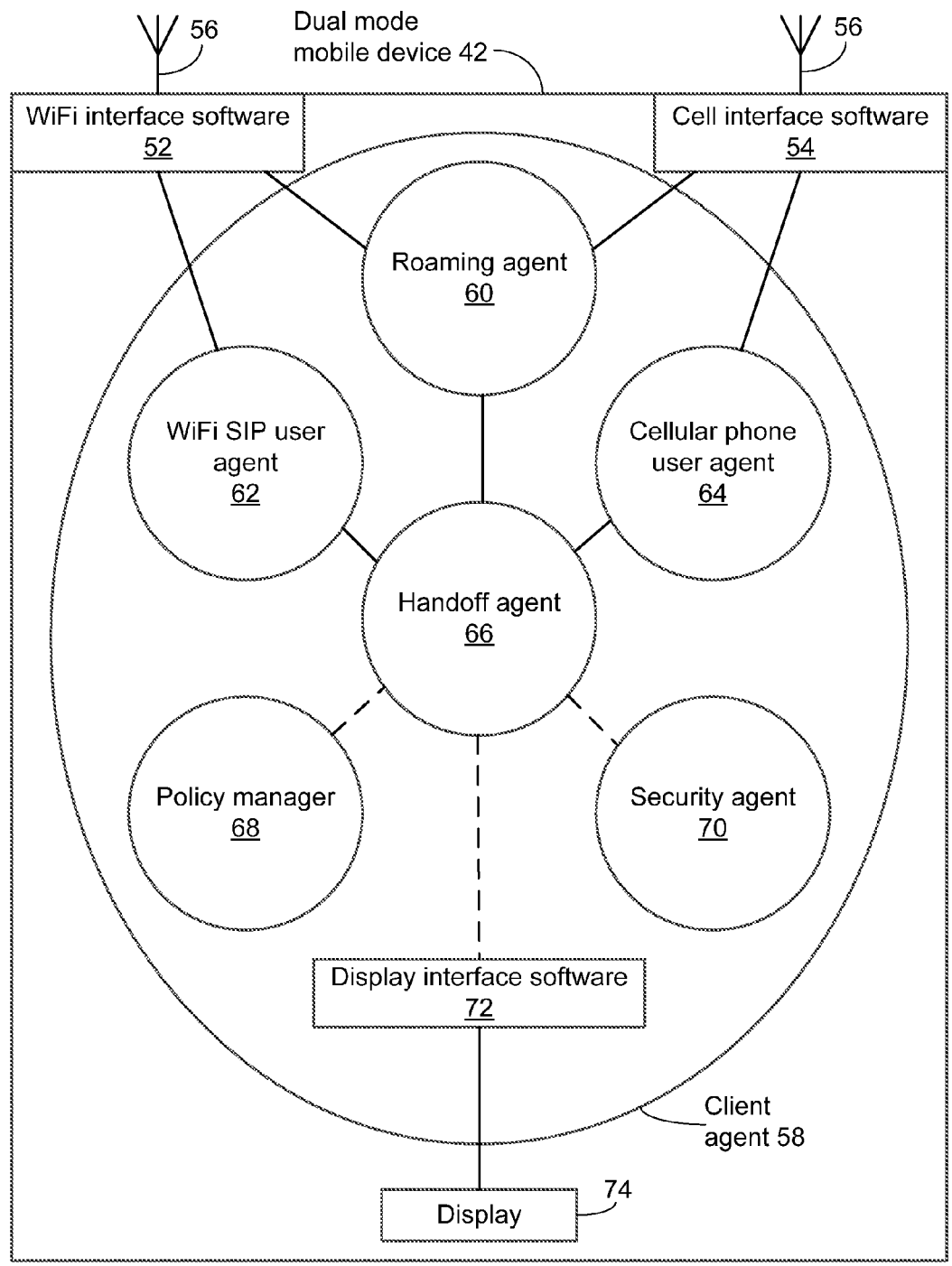
FIG. 2 is a block diagram of a dual mode mobile device according to an embodiment of the present invention.

Referring to FIG. 2, a block diagram of an exemplary dual-mode mobile device 42 is shown. The mobile device 42 has a WiFi interface 52 and a cell interface 54, each respectively connected to an antenna 56. The dual mode mobile device 42 also has a client agent 58, which includes a roaming agent 60, and other agents, such as a WiFi SIP user agent 62, a cellular phone user agent 64, a handoff agent 66, a policy manager 68, a security agent 70 and a display interface 72 connected to a display 74. The client agent 58 can manage the interaction of the dual mode mobile device 42 with the wireless communication gateway 12; the consistency of the display 74 regardless of the mode in which the dual mode mobile device 42 is active; the interaction of the dual mode mobile device 42 with the SIP servers 20, shown in FIG. 1, when the mobile device is in WiFi mode; and security of the mobile device 42.

The roaming agent 60 monitors both the WiFi interface 52 and the cell interface 54 to determine which mode the dual mode mobile device 42 is using and which modes are available for use by the mobile device. If handoff between the WiFi and cellular networks is determined to be necessary, either due to a user command or an automatic determination based on the availability or strength of the WiFi network, the roaming agent 60 communicates with the handoff agent 66, which, in conjunction with either the WiFi SIP user agent 62 or the cellular phone user agent 64, effects a handoff to the appropriate network. The handoff agent 66 can also use policies from the policy manager 68 to determine which mode is applicable. The handoff agent 66 is also responsible for interacting with the display 74 of the device, through the display interface software, and for ensuring that correct options (also based on policy, if applicable) are presented to the user in a uniform way regardless of function or mode of the mobile device 42. In certain circumstances, the handoff agent 66 can use the security agent 70 to encrypt/decrypt messages, collect personal identification numbers (PINs) and passwords, and invoke a 'kill' command to cause the mobile device 42 to be unusable, and the data on it inaccessible.

FIGS. 3-13 show exemplary call flows for establishing calls to PSTN and SIP destinations, over GSM and WiFi networks, and handing off of the established calls to a GSM or WiFi network, as appropriate, under the control of the client-side handoff agent 66, shown in FIG. 2. Access and interaction with an adjunct server associated with the user's home network is not required. For the purposes of the following examples, it is assumed that the dual-mode device subscriber's home network is the WiFi or VoIP network, and the dual-mode device supports two user identities: a PSTN PUID, and a SIP PUID and phone number routed to the PSTN gateway 32. The mobile station ISDN (MSISDN) is hidden, and the subscriber only needs to provide the SIP PUID and phone number to potential callers. ISUP to SIP (and vice versa) signaling mapping is performed by the PSTN gateway 32, or by other supported circuit switched gateways. To support GSM to WiFi handoff as described in relation to FIGS. 7-10, a GPRS always-on class A device is needed. For handoffs of a Class B device from the WiFi network to a GSM network, WiFi access is used for the handoff. Implementations applicable to handoff from a GSM to a WiFi network for class B/C devices are described in relation to FIGS. 11-13.

In FIGS. 3-13, the dual-mode subscriber device 42 has a SIP PUID of Alice@sip.com and a phone number of 1-613-555-6789, a SIP-enabled device "Bob", to which Alice can connect has a SIP PUID of Bob@sip.com, and a PSTN telephone to which Alice can connect has a telephone number of 1-613-234-1234. As used herein, the conventions "Alice" and "Bob" refer to the applicable dual-mode and SIP-enabled communications device nodes, as well as to the application software, described above as roaming and handoff agents, executing thereon. In addition to the device nodes, the call messaging in the various embodiments also flows between the WLAN or WiFi base station network 22, the SIP server 20, the PSTN gateway 32, PSTN switches in the PSTN 46, and a visited cell network 44, such as a 2.5 G GSM cellular network. Under the self-contained and direct control of the handoff agent 66, appropriate VoIP and/or CS media streams are set up between various nodes, using SIP and ISUP signaling, as described below. The exemplary embodiments describe handoffs between WiFi and GSM networks. However, as will be apparent to those of skill in the art, the present invention can be implemented for other communications protocols, such as H.323 and CDMA. Appropriate registration to the initial or first network is assumed for each described embodiment, and is shown in the drawings prior to first establishing the call.

Figure 3A:
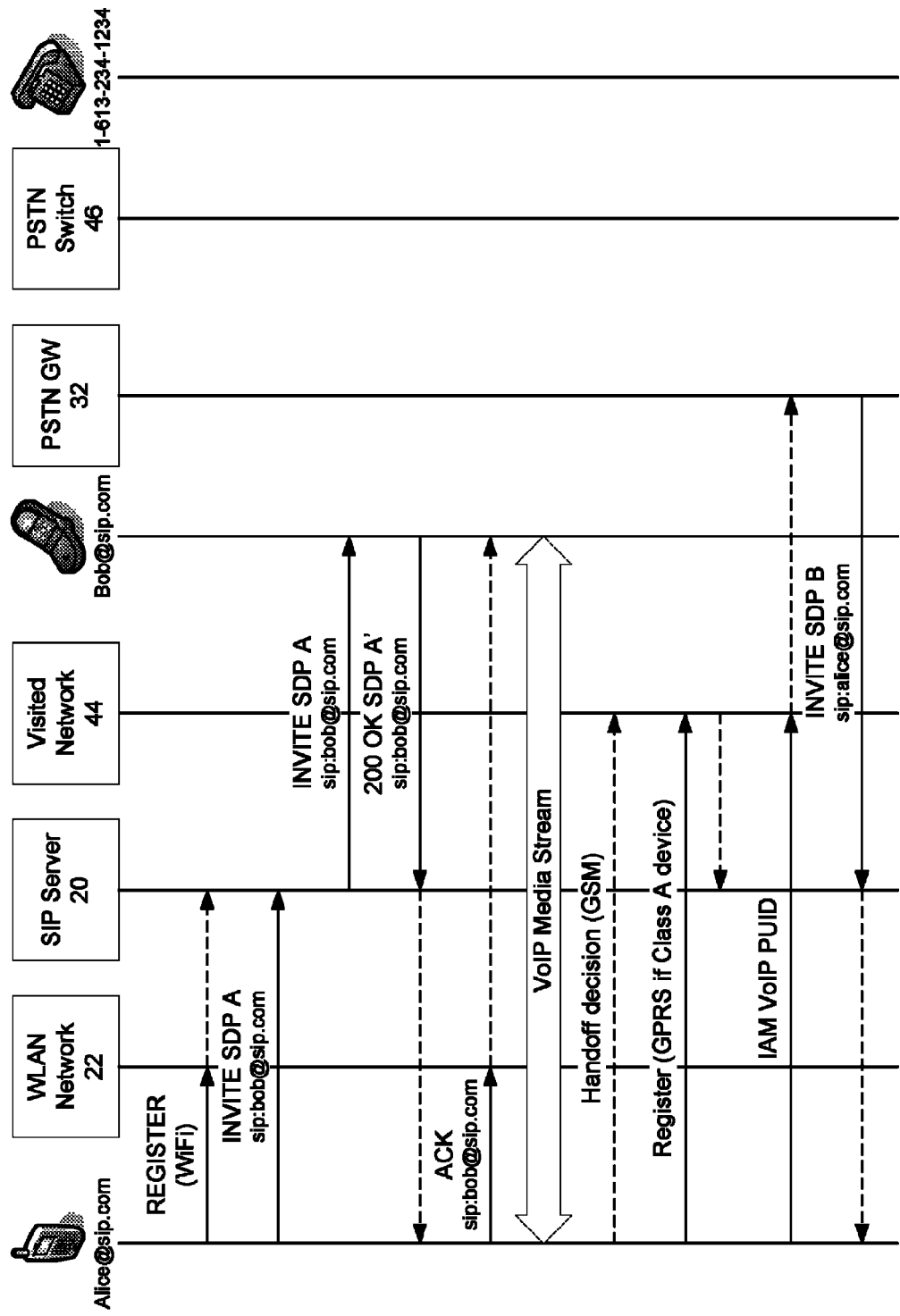
FIGS. 3A and 3B show a flow diagram for establishing an outgoing WiFi call to a SIP destination, and subsequent handoff to a GSM network according to an embodiment of the present invention.
Figure 3B:
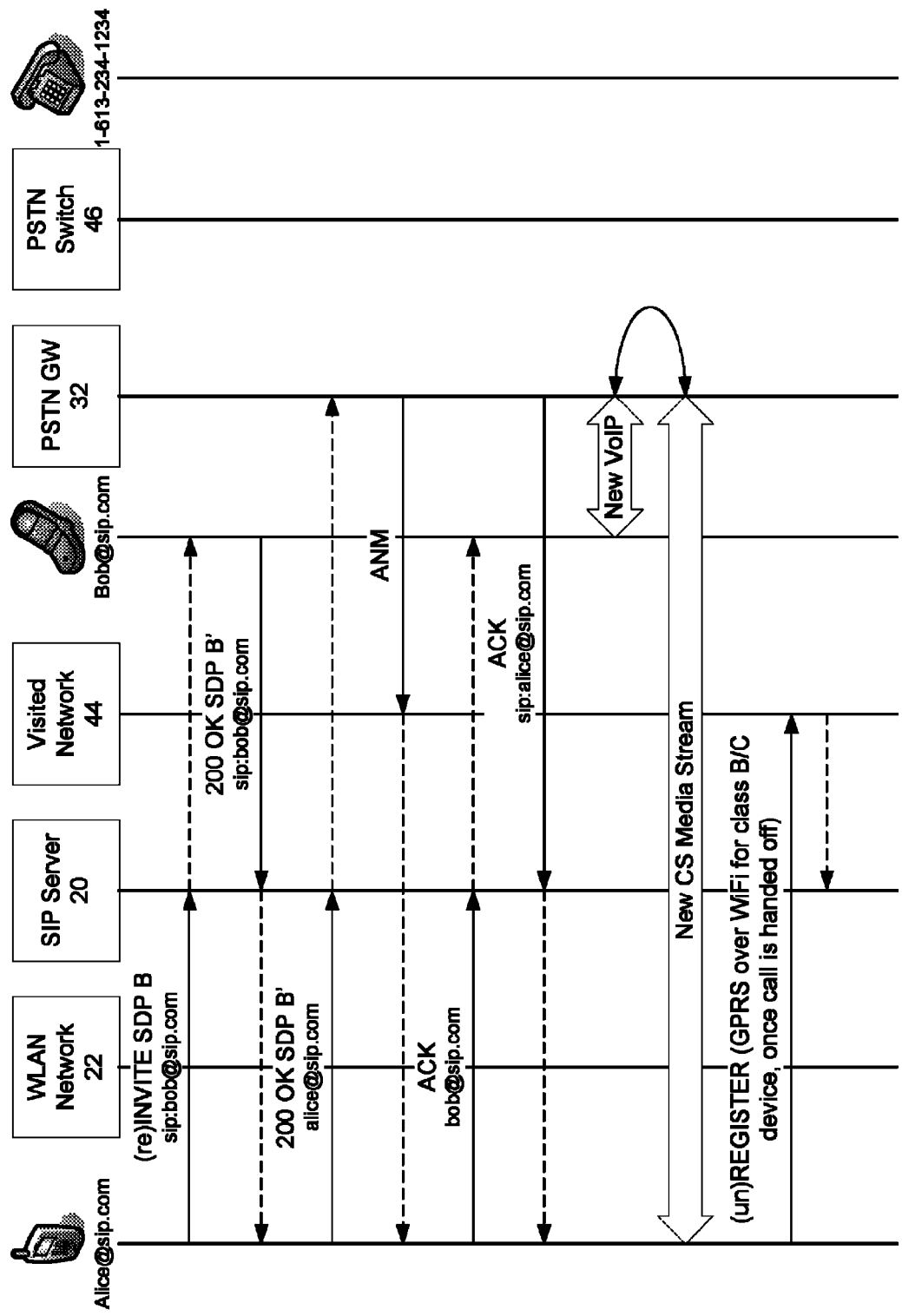

FIGS. 3A and 3B show a flow diagram for establishing an outgoing WiFi call to a SIP destination, and subsequent handoff to a GSM network according to an embodiment of the present invention. To establish the WiFi call, Alice sends a SIP INVITE message containing Bob's PUID to the SIP server 20. The SIP server 20 routes the INVITE message to Bob, which then returns a SIP 200 OK message to the SIP server 20, and then to Alice. Alice acknowledges receipt of the 200 OK message by returning an ACK to Bob. A VoIP media stream is thus established between Alice and Bob. When Alice decides to handoff the call due to, for example a weakening WiFi signal and detection of an appropriate visited network 44, such as a GSM network, Alice registers to the visited network 44, and sends an ISUP Initial Address Message (IAM) containing her VoIP PUID to the visited network 44, where it is forwarded to the PSTN gateway 32. The PSTN gateway 32 then sends an INVITE message containing Alice's PUID to Alice, via the SIP server 20. On receipt of the INVITE, Alice sends a (re) INVITE message containing Bob's PUID to the SIP server 20, which transmits it to Bob. Bob returns a 200 OK response to Alice, via the SIP server 20. Alice then sends a 200 OK message to the PSTN gateway 32. The PSTN gateway 32 responds to the initial IAM message by returning an ISUP Answer Message (ANM) to Alice via the visited network 44. Alice then responds to the 200 OK received from Bob by sending an ACK to Bob via the SIP server 20, and the PSTN gateway 32 similarly acknowledges the 200 OK from Alice. In this manner, a new CS media stream is set up between Alice and the PSTN gateway 32, and a hairpinning VoIP media stream is set up between the PSTN gateway 32 and Bob, thus modifying the initial communications channel. The call between Alice and Bob then proceeds over the modified communications channel.

Figure 4A:
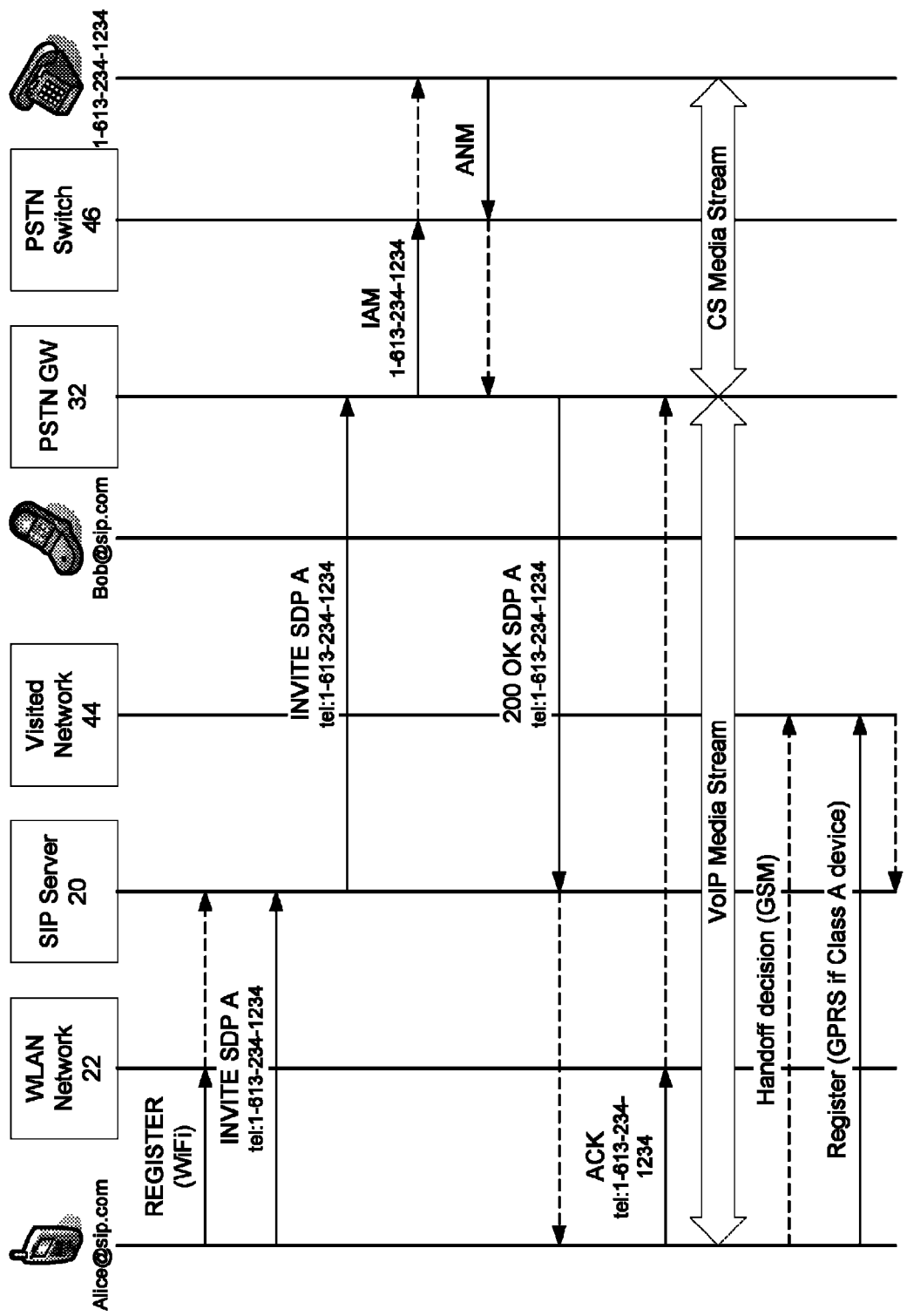
FIGS. 4A and 4B show a flow diagram for establishing an outgoing WiFi call to a PSTN destination, and subsequent handoff to a GSM network according to an embodiment of the present invention.
Figure 4B:
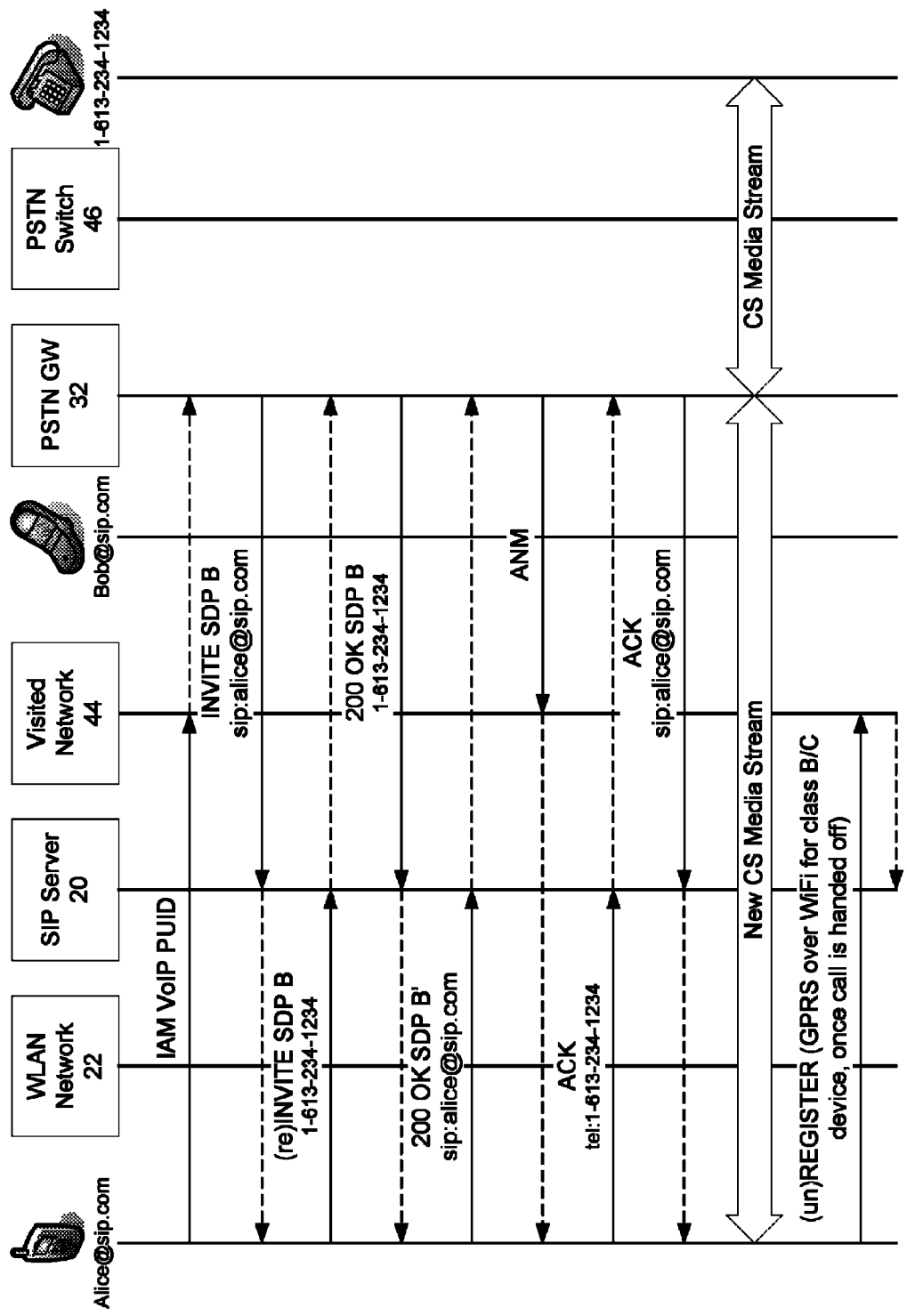

FIGS. 4A and 4B show a flow diagram for establishing an outgoing WiFi call to a PSTN destination, and subsequent handoff to a GSM network according to an embodiment of the present invention. To establish the call to the PSTN destination from the WiFi network, Alice sends an INVITE message containing the telephone number of the PSTN destination to the SIP server 20. The SIP server 20 sends the INVITE to the PSTN gateway 32, which translates the message to an IAM containing the PSTN destination phone number. The IAM is sent to the PSTN destination device via the PSTN switch (or switches) 46. The PSTN destination replies to the PSTN gateway 32 with an ANM, thus setting up a CS media stream between the PSTN gateway 32 and the PSTN destination. The PSTN gateway 32 then returns a 200 OK to the SIP server 20, and thence to Alice, and Alice acknowledges the 200 OK, thereby establishing a VoIP media stream between Alice and the PSTN gateway 32. The call to the PSTN destination then proceeds over the communication channel formed by the combined VoIP and CS media streams. When a handoff to the visited network 44 is desirable, Alice registers to the visited network 44, and sends a IAM containing her VoIP PUID to the visited network 44 and then to the PSTN gateway 32. The PSTN gateway 32 responds by sending an INVITE to Alice via the SIP server 20. Alice then sends a (re)INVITE containing the PSTN phone number to the PSTN gateway 32 via the SIP server 20. The PSTN gateway 32 responds to Alice with a 200 OK message, and Alice responds to the INVITE from the PSTN gateway 32 with another 200 OK. The PSTN gateway 32 then respond to Alice's initial IAM by sending an ANM to Alice via the visited network 44, thus establishing a new CS media stream between Alice and the PSTN gateway 32. Alice and the PSTN gateway 32 then each acknowledge the respective 200 OK messages. The call is thus handed off, and proceeds over the modified communications channel consisting of the new CS media stream between Alice and the PSTN gateway 32, and the original CS media stream set up between the PSTN gateway 32 and the PSTN destination.

Figure 5A:
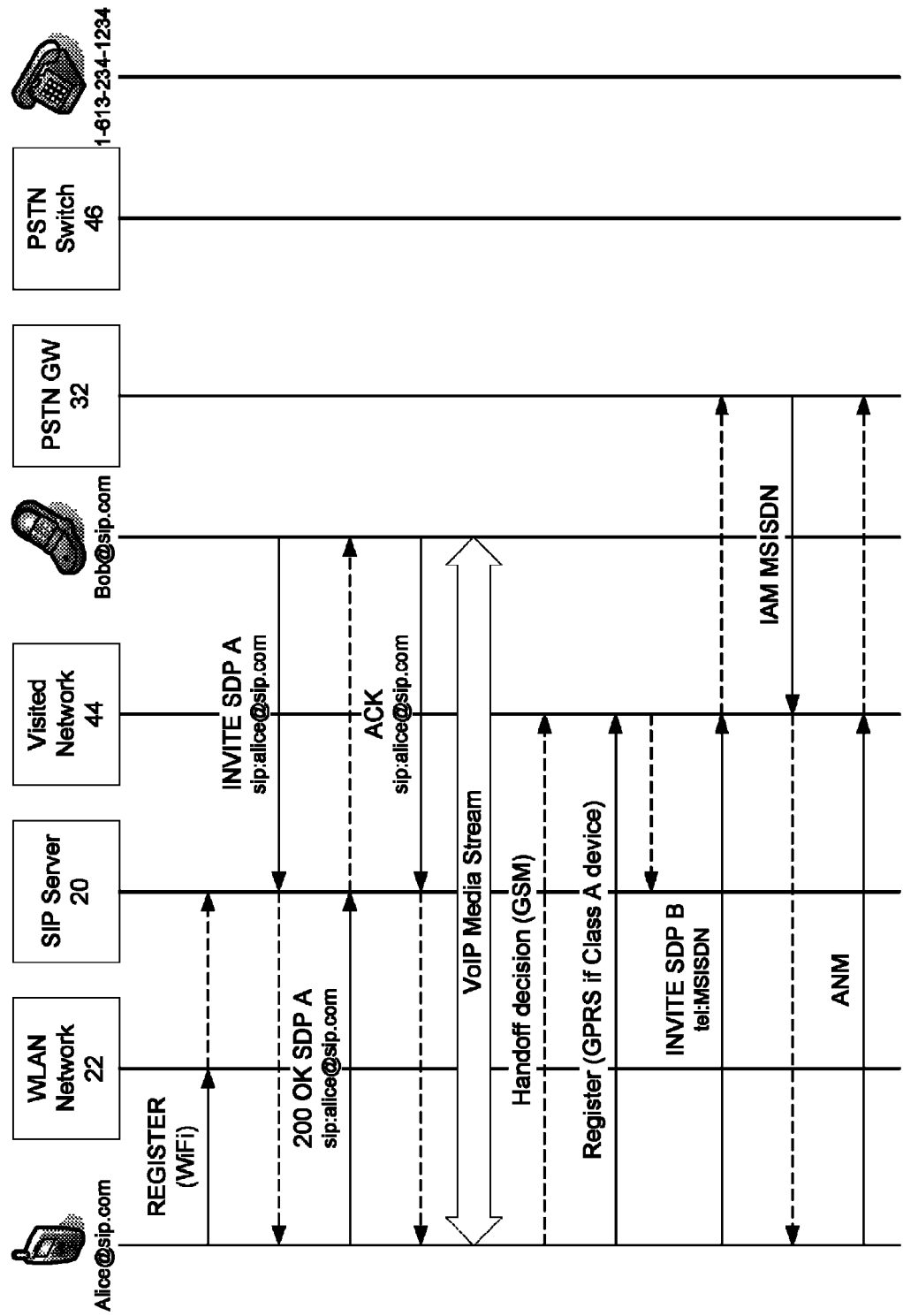
FIGS. 5A and 5B show a flow diagram for establishing an incoming WiFi call from a SIP destination, and subsequent handoff to a GSM network according to an embodiment of the present invention.
Figure 5B:
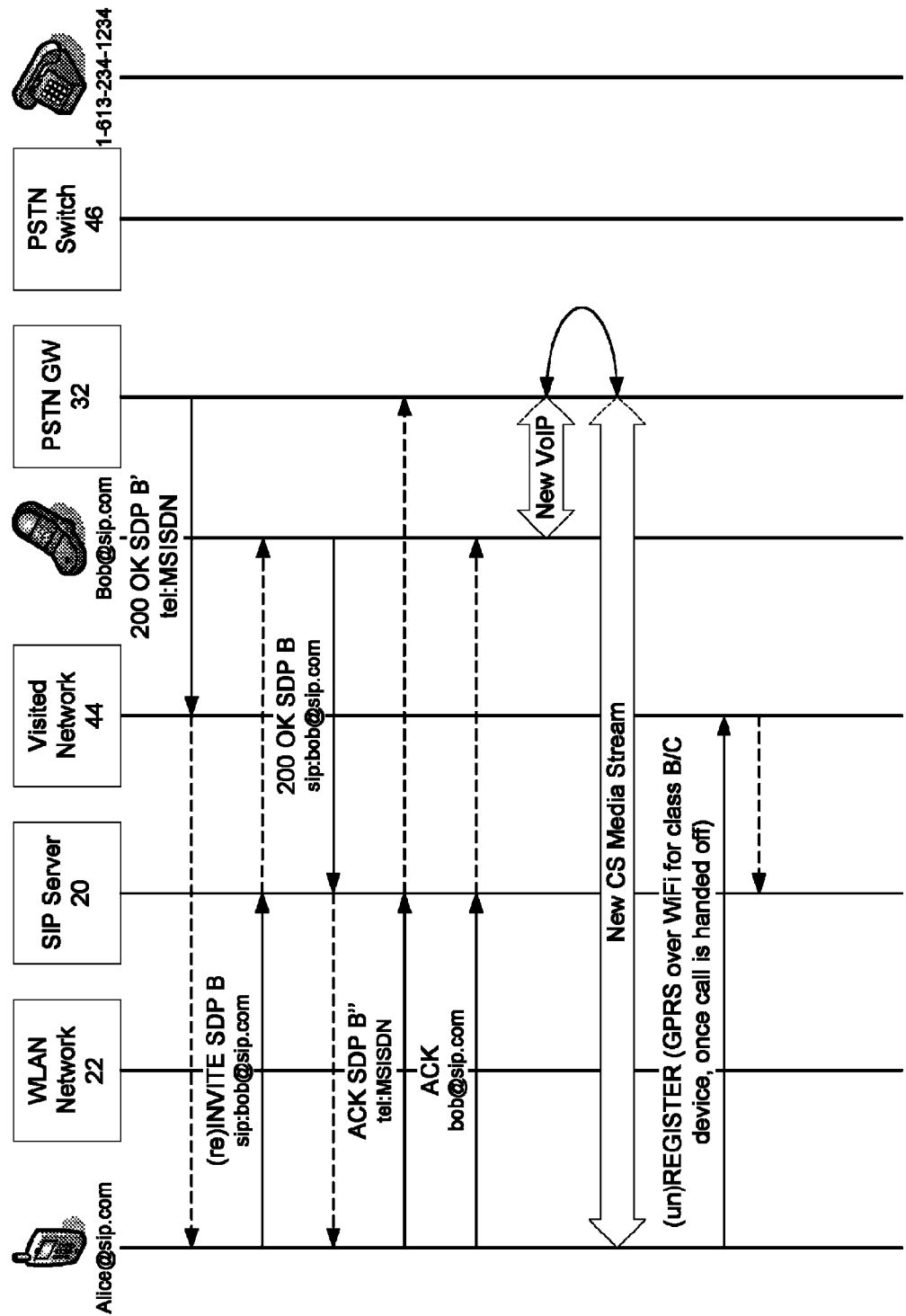

FIGS. 5A and 5B show a flow diagram for establishing an incoming WiFi call from a SIP destination, and subsequent handoff to a GSM network according to an embodiment of the present invention. The call from the SIP destination, Bob, to Alice is initiated by Bob sending an INVITE containing Alice's VoIP PUID to Alice via the SIP server 20. Alice responds to Bob with a 200 OK message, which is acknowledged by Bob. A VoIP media stream is thus established between Bob and Alice, and their call can proceed. When Alice roams out of range of the WiFi network, or otherwise determines that a handoff to the visited network 44 is necessary, Alice registers with the visited network 44 and sends an INVITE message containing her MSISDN to the visited network 44, where it is forwarded to the PSTN gateway 32. The PSTN gateway 32 sends an IAM containing the MSISDN to the visited network 44, which forwards the message to Alice. Alice responds with an ANM to the visited network 44 and the PSTN gateway 32, thus establishing a new CS media stream between Alice and the PSTN gateway 32. The PSTN gateway 32 then responds to the INVITE from Alice by sending a 200 OK message back to Alice via the visited network 44. Alice then sends a (re)INVITE to Bob via the SIP server 20, and Bob responds with a 200 OK. Alice then acknowledges the 200 OK from the PSTN gateway 32, and the 200 OK from Bob. Thus, a hairpinning VoIP media stream is set up between the PSTN gateway 32 and Bob, and handoff is complete. The call from Bob to Alice then proceeds on the modified communication channel formed by the new CS media stream and the hairpinning VoIP media stream.

Figure 6A:
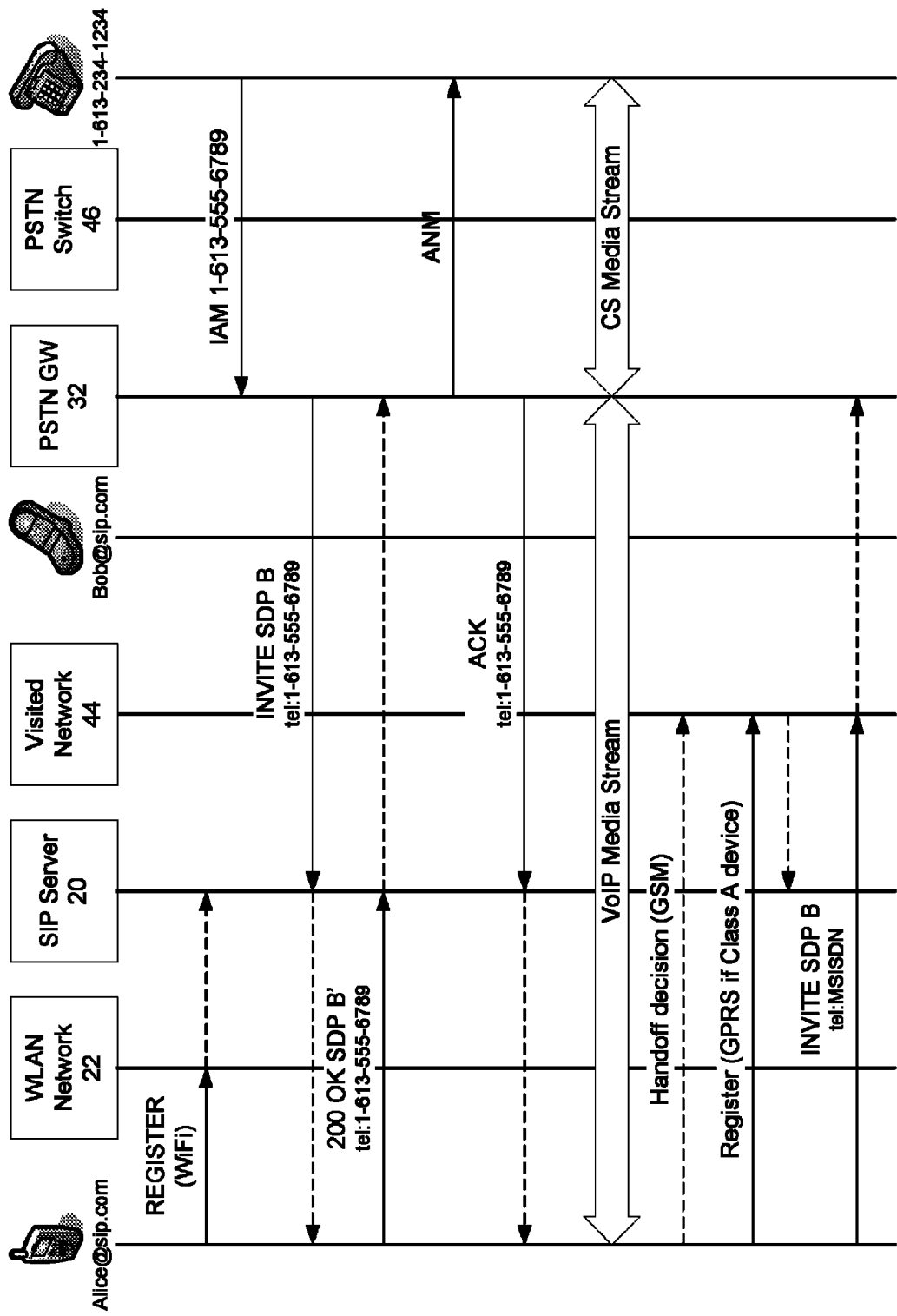
FIGS. 6A and 6B show a flow diagram for establishing an incoming WiFi call from a PSTN destination, and subsequent handoff to a GSM network according to an embodiment of the present invention.
Figure 6B:
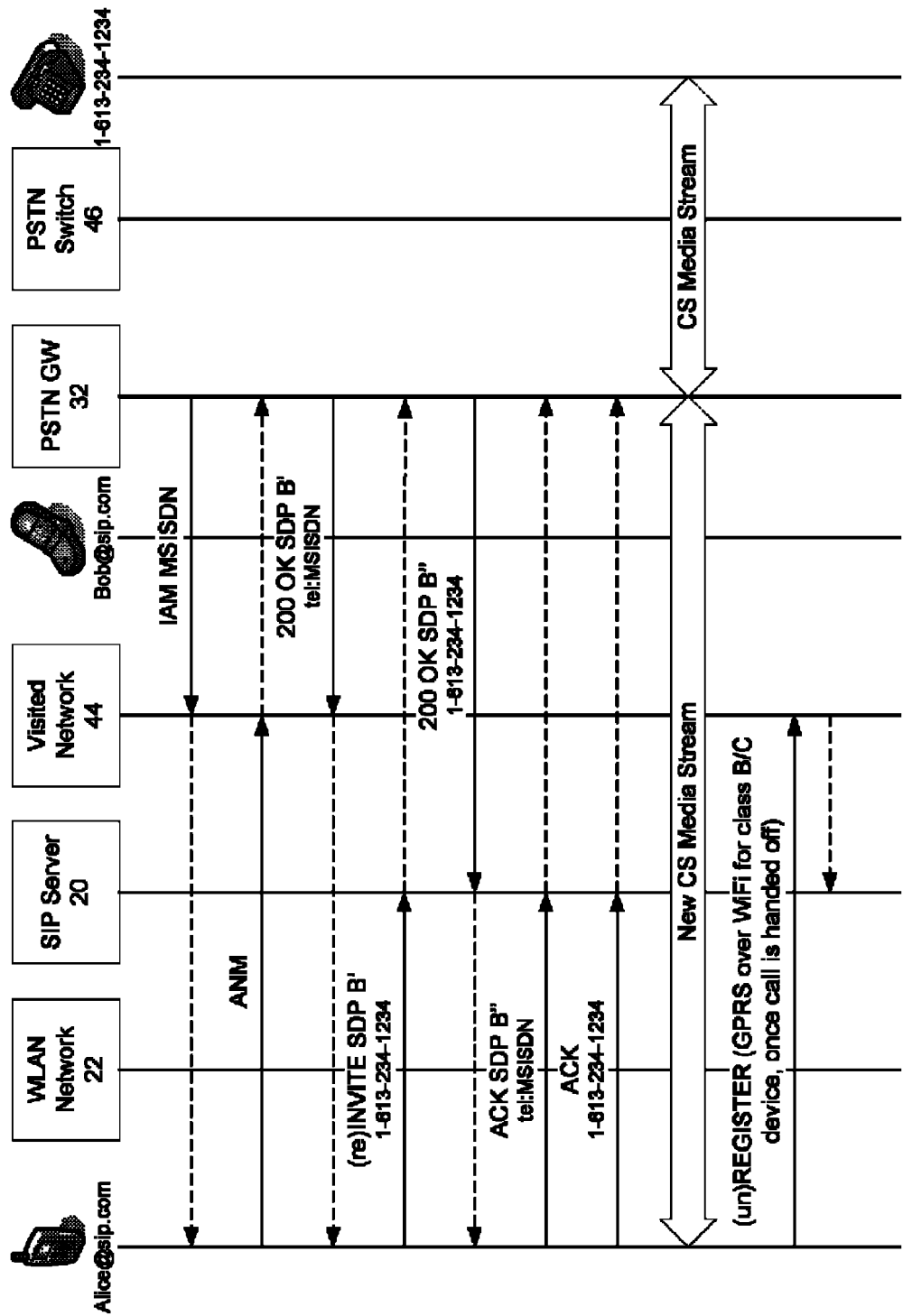

FIGS. 6A and 6B show a flow diagram for establishing an incoming WiFi call from a PSTN destination, and subsequent handoff to a GSM network according to an embodiment of the present invention. To initially establish the call to Alice in the WiFi network, the PSTN destination device sends an IAM containing Alice's SIP phone number to the PSTN gateway 32. The PSTN gateway 32 translates the message and sends a SIP INVITE to Alice via the SIP server 20. Alice responds with a 200 OK to the PSTN gateway 32, which then sends an ANM to the PSTN destination, and acknowledges the 200 OK back to Alice. This exchange of messages sets up a VoIP media stream between Alice and the PSTN gateway 32, and sets up a CS media stream between the PSTN gateway 32 and the PSTN destination. The call from the PSTN destination then proceeds over the communication channel established by the two streams. When Alice considers handoff to the visited network 44 to be desirable, she registers to the visited network 44 and sends an INVITE containing her MSISDN to the visited network 44 and the PSTN gateway 32. The PSTN gateway 32 then sends an IAM containing the MSISDN to Alice via the visited network 44, and Alice responds with an ANM. The PSTN gateway 32 then responds to the INVITE from Alice by sending a 200 OK message back to her via the visited network 44. Alice then sends a (re)INVITE containing her SIP phone number to the PSTN gateway 32 via the SIP server 20. The PSTN gateway 32 responds with a 200 OK, and Alice acknowledges both outstanding 200 OK messages to the PSTN gateway 32 via the SIP server 20. A new CS media stream is thus established between Alice and the PSTN gateway 32, and the call proceeds over the new CS media stream and the original CS media stream between the PSTN gateway 32 and the PSTN destination.

Figure 7A:
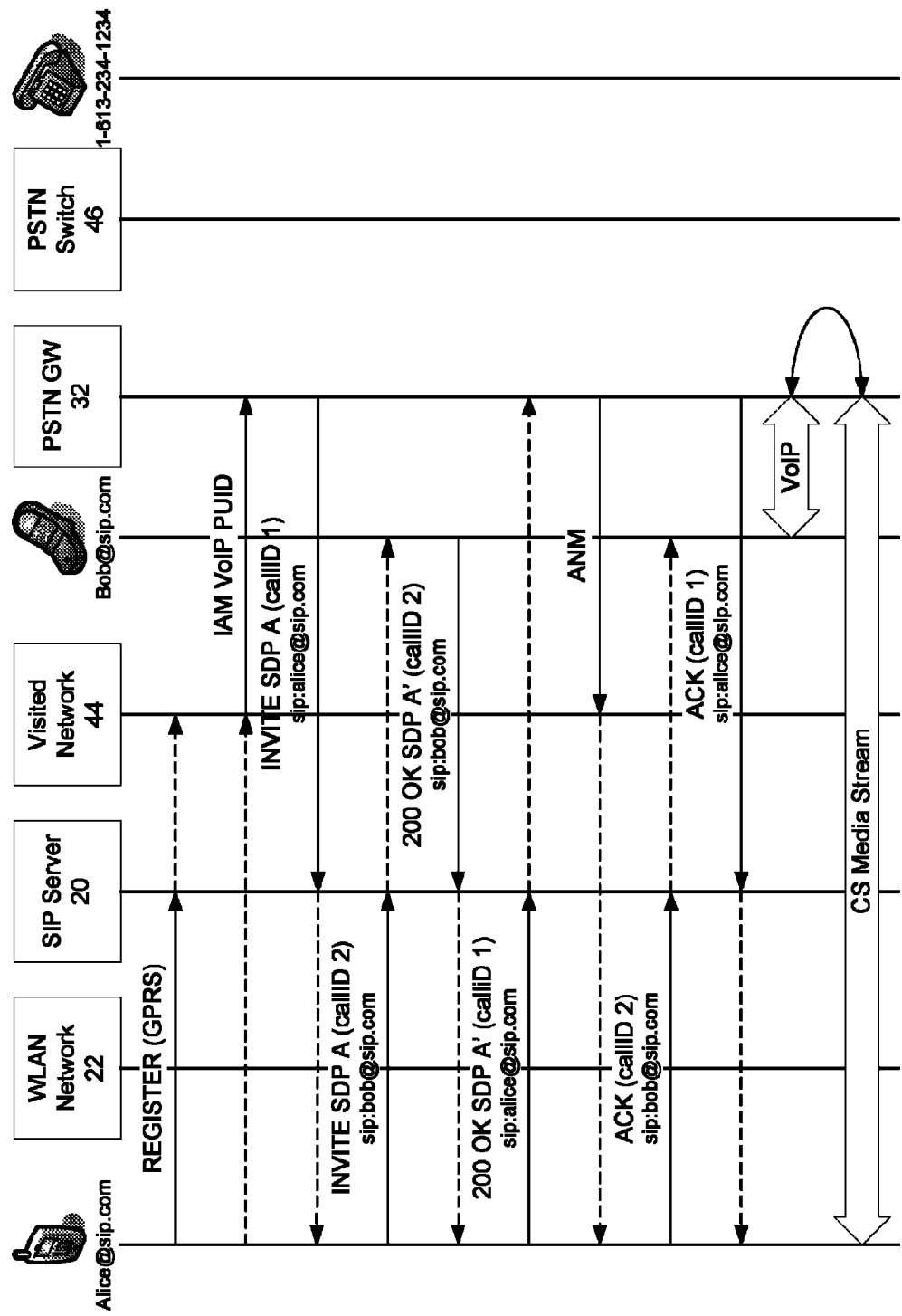
FIGS. 7A and 7B show a flow diagram for establishing an outgoing GSM call to a SIP destination, and subsequent handoff to a WiFi network according to an embodiment of the present invention.
Figure 7B:
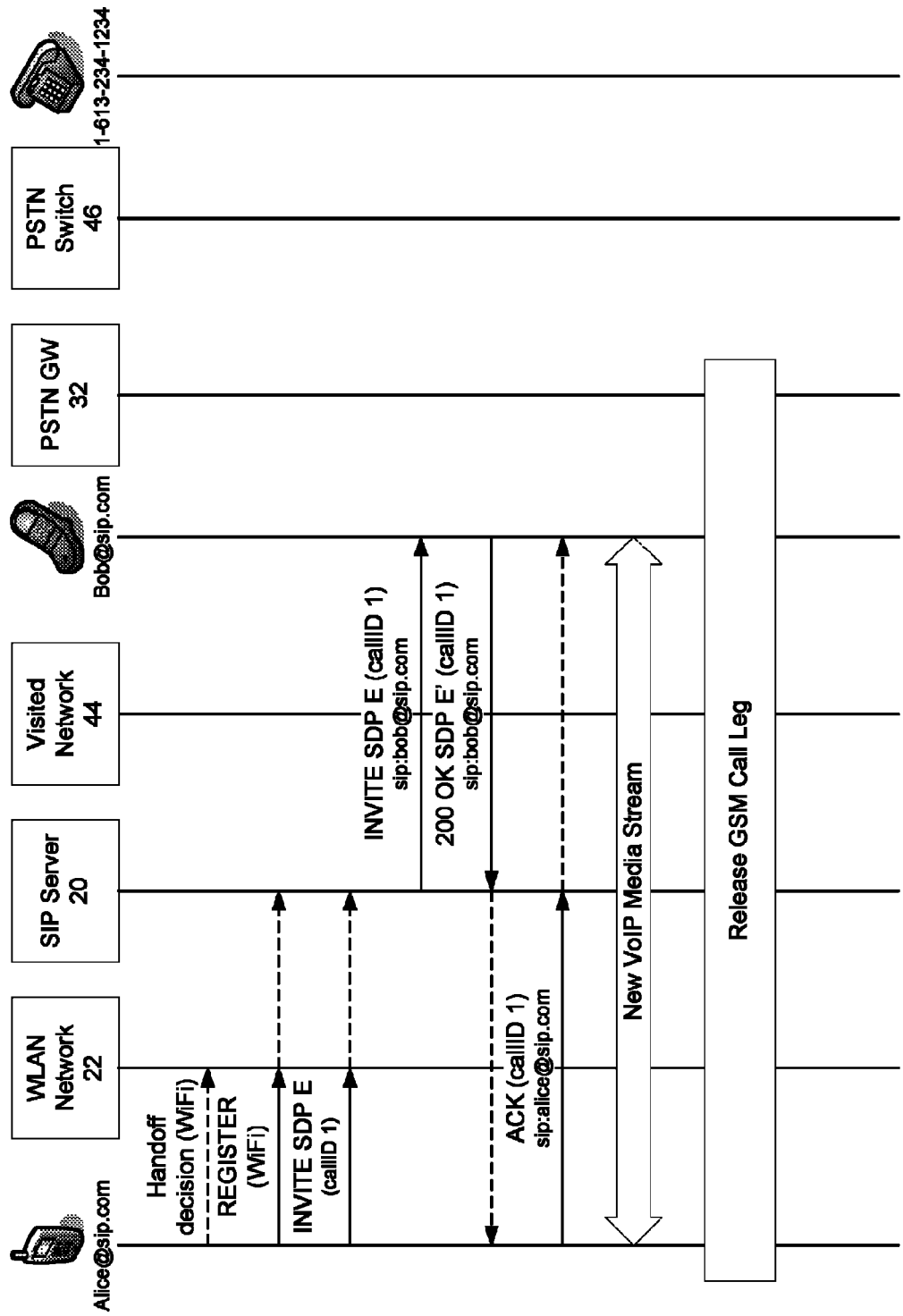

FIGS. 7A and 7B show a flow diagram for establishing an outgoing GSM call to a SIP destination, and subsequent handoff to a WiFi network according to an embodiment of the present invention. While roaming in the visited network 44, Alice establishes a call to Bob by sending an IAM message containing her VoIP PUID to the PSTN gateway 32 via the visited network 44. The PSTN gateway 32 then sends an INVITE containing Alice's VoIP PUID to Alice via the SIP server 20. Alice can then send an INVITE to Bob, and receives a 200 OK message from Bob via the SIP server 20. Alice then sends a 200 OK to the PSTN gateway 32 via the SIP server 20. On receipt of the 200 OK from Alice, the PSTN gateway 32 sends an ANM back to the visited network 44. Alice then acknowledges Bob's 200 OK and Bob acknowledges Alice's. This exchange of messages establishes a CS media stream between Alice and the PSTN gateway 32, and a hairpinned VoIP media stream between the PSTN gateway 32 and Bob. When Alice roams within range of the WiFi network, handoff is indicated. Alice then registers to the WiFi network, and sends a (re)INVITE to Bob via the SIP server 20. Bob responds with a 200 OK message back to Alice via the SIP server 20. Alice acknowledges the 200 OK, and a new VoIP media stream is established between Alice and Bob, and the original GSM call leg can then be released. The call is thus handed off, and continues over the new VoIP stream.

Figure 8A:
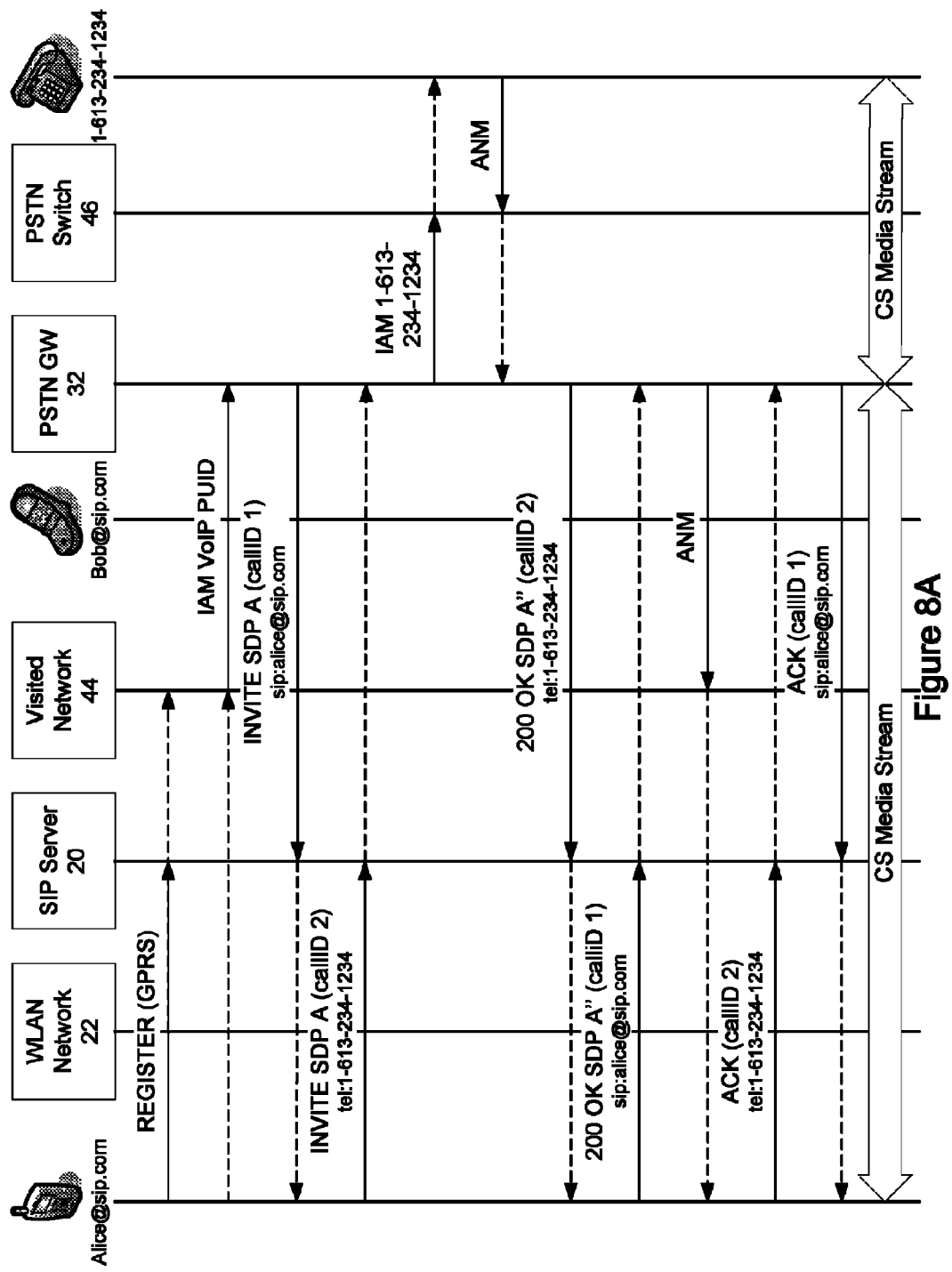
FIGS. 8A and 8B show a flow diagram for establishing an outgoing GSM call to a PSTN destination, and subsequent handoff to a WiFi network according to an embodiment of the present invention.
Figure 8B:
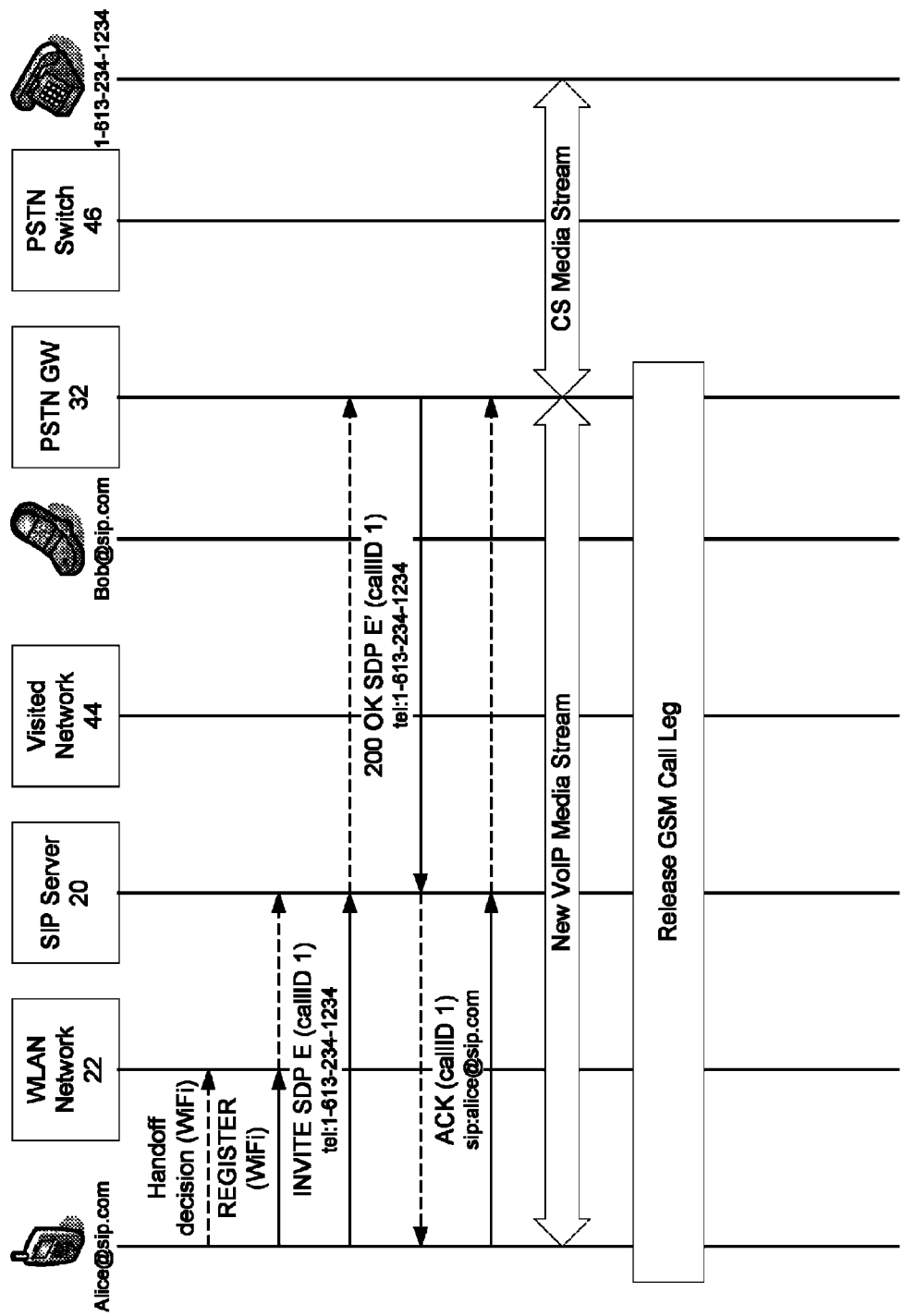

FIGS. 8A and 8B show a flow diagram for establishing an outgoing GSM call to a PSTN destination, and subsequent handoff to a WiFi network according to an embodiment of the present invention. While again roaming in the visited network 44, Alice establishes a call to the PSTN destination by sending an IAM message containing her VoIP PUID to the PSTN gateway 32 via the visited network 44. The PSTN gateway 32 then sends an INVITE containing Alice's VoIP PUID to Alice via the SIP server 20. Alice then sends an INVITE containing the PSTN destination phone number to the PSTN gateway 32 via the SIP server 20. The PSTN gateway 32 translates the message, and sends an IAM containing the PSTN destination phone number to the PSTN destination. The PSTN destination returns and ANM to the PSTN gateway 32. The PSTN gateway 32 then sends a 200 OK message to Alice via the SIP server 20. Alice then responds to the INVITE from the PSTN gateway 32 by sending a 200 OK to the PSTN gateway 32 via the SIP server 20. On receipt of the 200 OK from Alice, the PSTN gateway 32 sends an ANM back to the visited network 44. Alice then acknowledges the 200 OK from the PSTN gateway 32, and the PSTN gateway 32 acknowledges Alice's 200 OK. This exchange of messages establishes a CS media stream between Alice and the PSTN gateway 32, and a further CS media stream between the PSTN gateway 32 and the PSTN destination. When Alice roams within range of the WiFi network and handoff is indicated, Alice then registers to the WiFi network, and sends an INVITE to containing the PSTN destination phone number to the PSTN gateway 32 via the SIP server 20. The PSTN gateway 32 responds with a 200 OK message back to Alice via the SIP server 20. Alice acknowledges the 200 OK, and a new VoIP media stream is established between Alice and the PSTN gateway 32. The original GSM call leg can then be released. The call is thus handed off, and continues over the new VoIP stream and the original CS media stream between the PSTN gateway 32 and the PSTN destination.

Figure 9A:
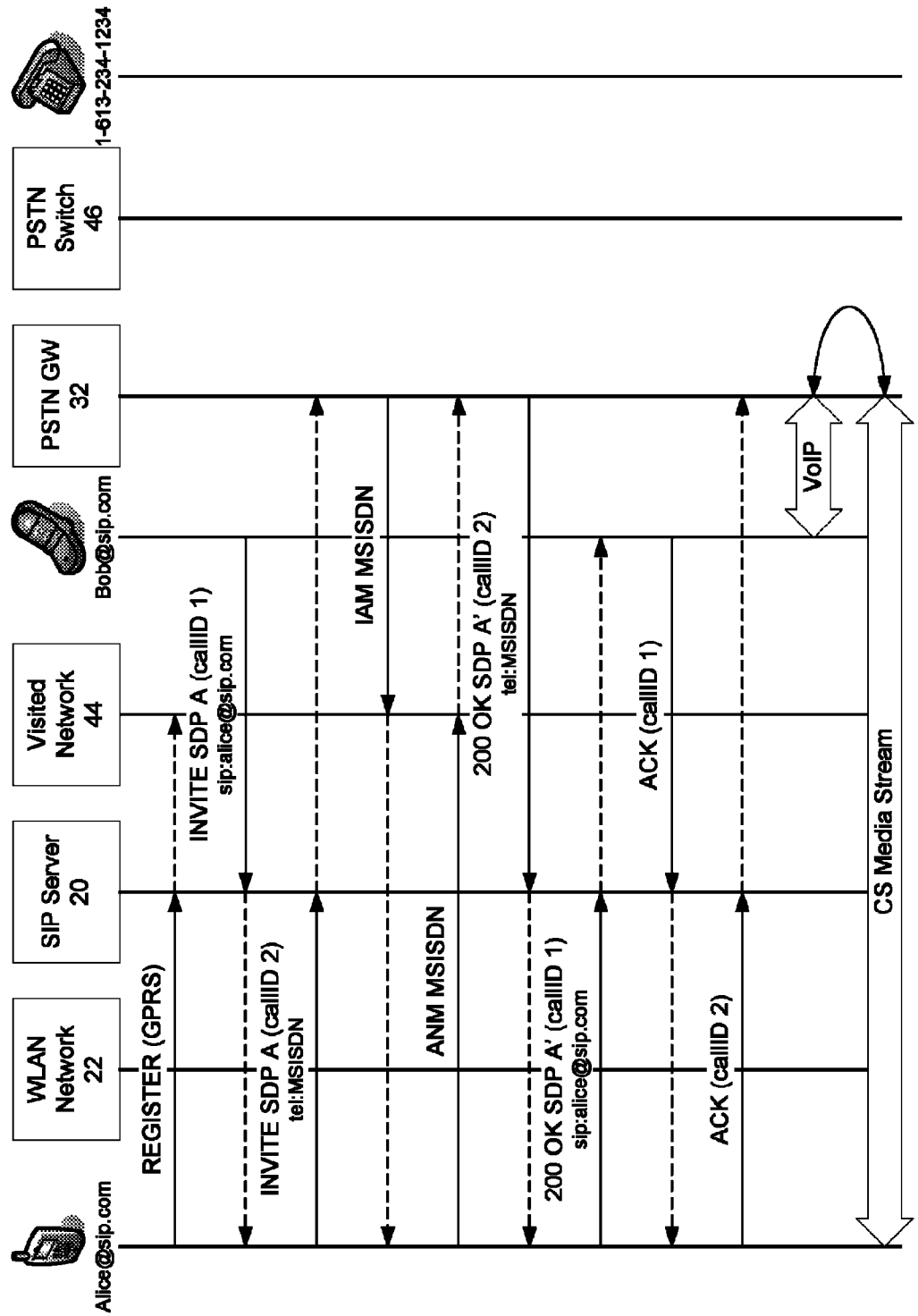
FIGS. 9A and 9B show a flow diagram for establishing an incoming GSM call from a SIP destination, and subsequent handoff to a WiFi network according to an embodiment of the present invention.
Figure 9B:
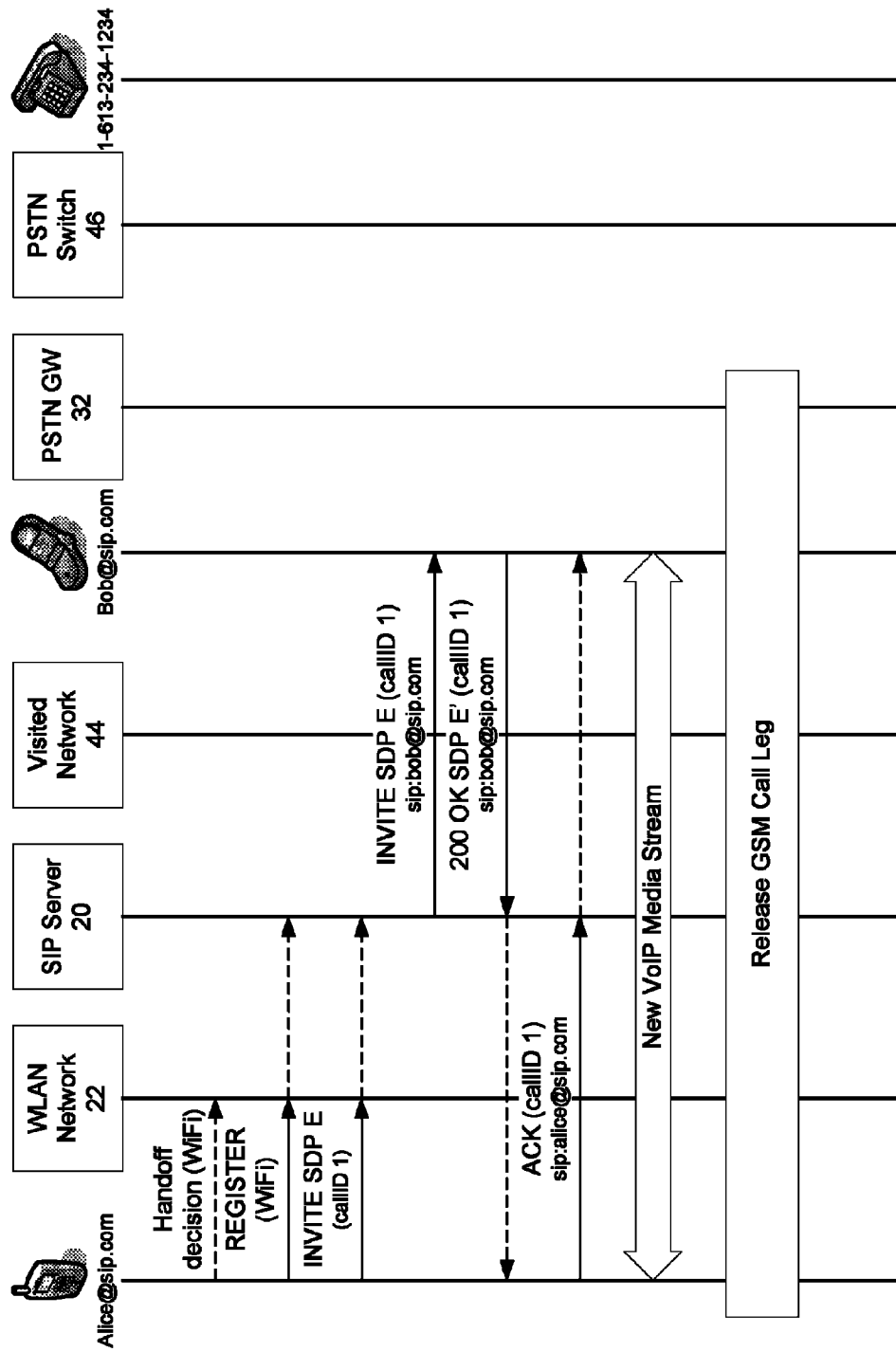

FIGS. 9A and 9B show a flow diagram for establishing an incoming GSM call from a SIP destination, and subsequent handoff to a WiFi network according to an embodiment of the present invention. Alice is roaming within the visited network 44. The call from Bob to Alice is initiated by Bob sending an INVITE containing Alice's VoIP PUID to Alice via the SIP server 20. Alice then sends an INVITE containing her MSISDN to the PSTN gateway 32, via the SIP server 20. The PSTN gateway 32 then sends an IAM containing the MSISDN to Alice and the visited network 44. Alice responds by sending an ANM to the visited network 44 and the PSTN gateway 32. The PSTN gateway 32 then responds to Alice's INVITE by sending a 200 OK message to Alice via the SIP server 20. Alice then responds to the INVITE from Bob with a 200 OK message, which is acknowledged by Bob, while Alice acknowledges the 200 OK message from the PSTN gateway 32. A CS media stream and a hairpinning VoIP media stream is thus established between Bob and Alice. When Alice roams out of range of the WiFi network, or otherwise determines that a handoff to the visited network 44 is necessary, Alice registers with the visited network 44 and sends an INVITE to Bob via the SIP server 20. Bob responds with a 200 OK. Alice then acknowledges the 200 OK from the PSTN gateway 32. This establishes a new VoIP media stream between Bob to Alice, and the original CS media stream can be released. The call is thus handed off, and proceeds on the new VoIP media stream.

Figure 10A:
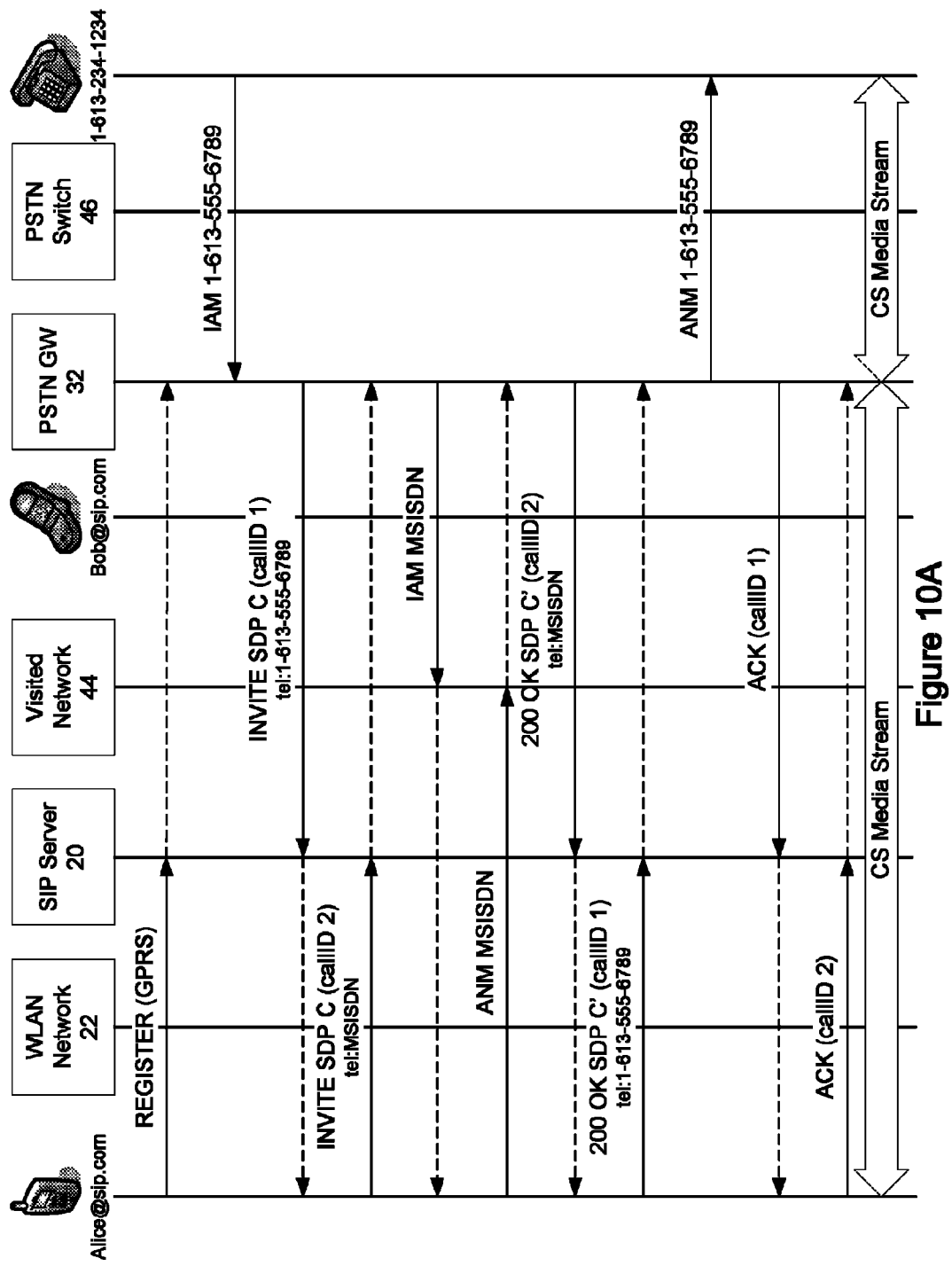
FIGS. 10A and 10B show a flow diagram for establishing an incoming GSM call from a PSTN destination, and subsequent handoff to a WiFi network according to an embodiment of the present invention.
Figure 10B:
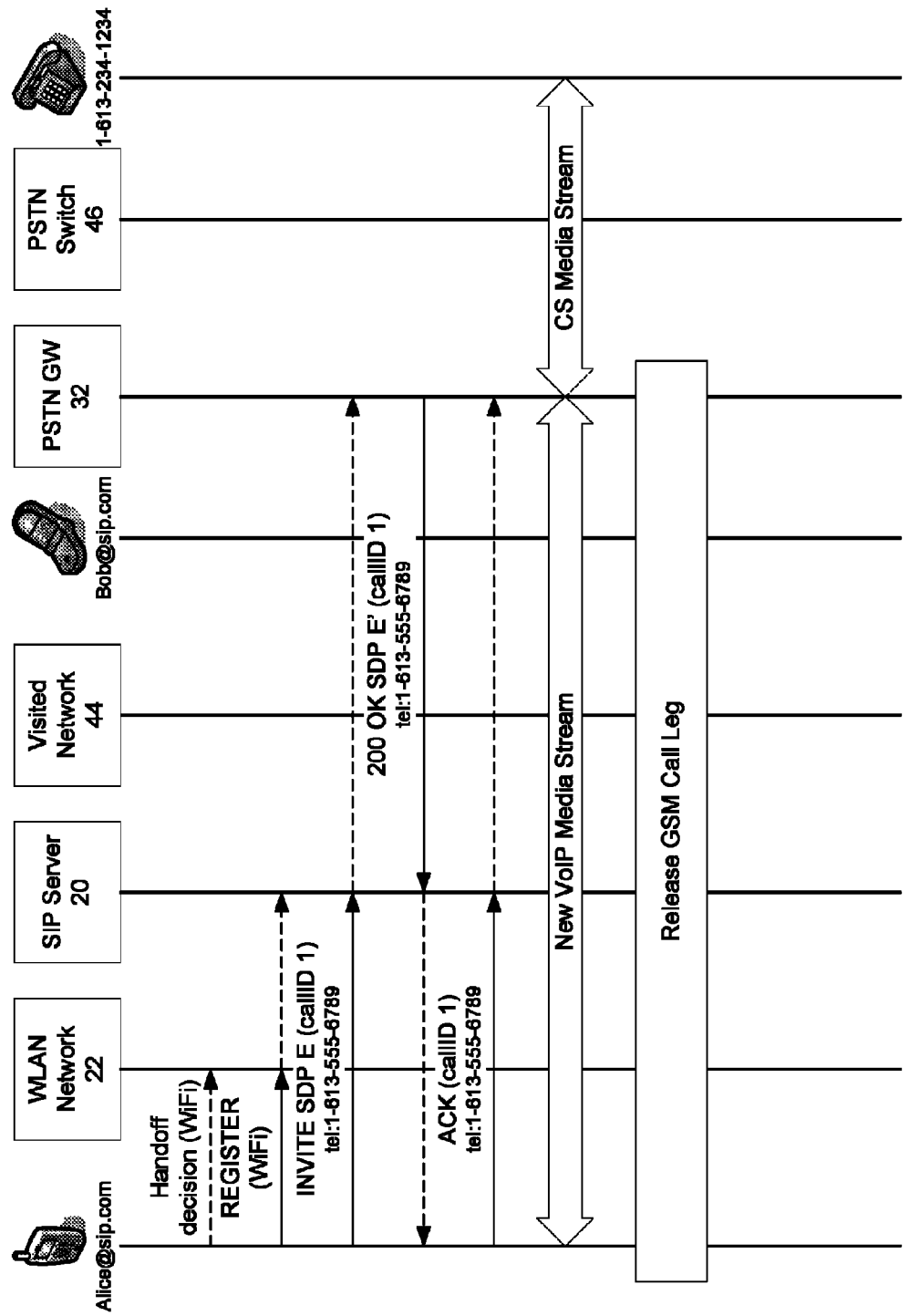

FIGS. 10A and 10B show a flow diagram for establishing an incoming GSM call from a PSTN destination, and subsequent handoff to a WiFi network according to an embodiment of the present invention. To initially establish the call to Alice in the visited network 44, the PSTN destination device sends an IAM containing Alice's SIP phone number to the PSTN gateway 32. The PSTN gateway 32 translates the message and sends a SIP INVITE to Alice via the SIP server 20. Alice then sends an INVITE containing her MSISDN to the SIP server 20 and the PSTN gateway 32. The PSTN gateway 32 then sends an IAM to the visited network 44, and Alice responds with an ANM to the visited network 44 and the PSTN gateway 32. The PSTN gateway 32 then sends a 200 OK message to Alice via the SIP server 20, and Alice sends a 200 OK to the PSTN gateway 32 in response to the INVITE from the PSTN gateway 32. On receipt of the 200 OK, the PSTN gateway 32 responds to the IAM from the PSTN destination by sending an ANM, and acknowledges the 200 OK back to Alice. Alice then acknowledges the 200 OK previously sent by the PSTN gateway 32. This exchange of messages establishes a CS media stream between Alice and the PSTN gateway 32, and a further CS media stream between the PSTN gateway 32 and the PSTN destination. The call from the PSTN destination then proceeds over the communication channel established by the two streams. When Alice roams within range of the WiFi network 22 and determines that handoff is desirable, she registers to the WiFi network and sends an INVITE containing her SIP phone number to the PSTN gateway 32 via the SIP server 20. The PSTN gateway 32 responds to the INVITE from Alice by sending a 200 OK message back to her via the SIP server 20. Alice acknowledges the 200 OK message to the PSTN gateway 3. A new VoIP media stream is thus established between Alice and the PSTN gateway 32, and the call proceeds over the new VoIP media stream and the original CS media stream between the PSTN gateway 32 and the PSTN destination.

In handoffs from a GSM network to the WiFi network, the handoff agent 66 maintains regular GSM call flow and direction. The handoff agent 66 invokes GSM explicit call transfer (ECT) to the subscriber's VoIP number, and puts the call on "hold". The handoff agent 66 then answers the VoIP call, and the call continues on a VoIP media stream. The continued VoIP call behaves according to WiFi call flows for handoff.

Figure 11:
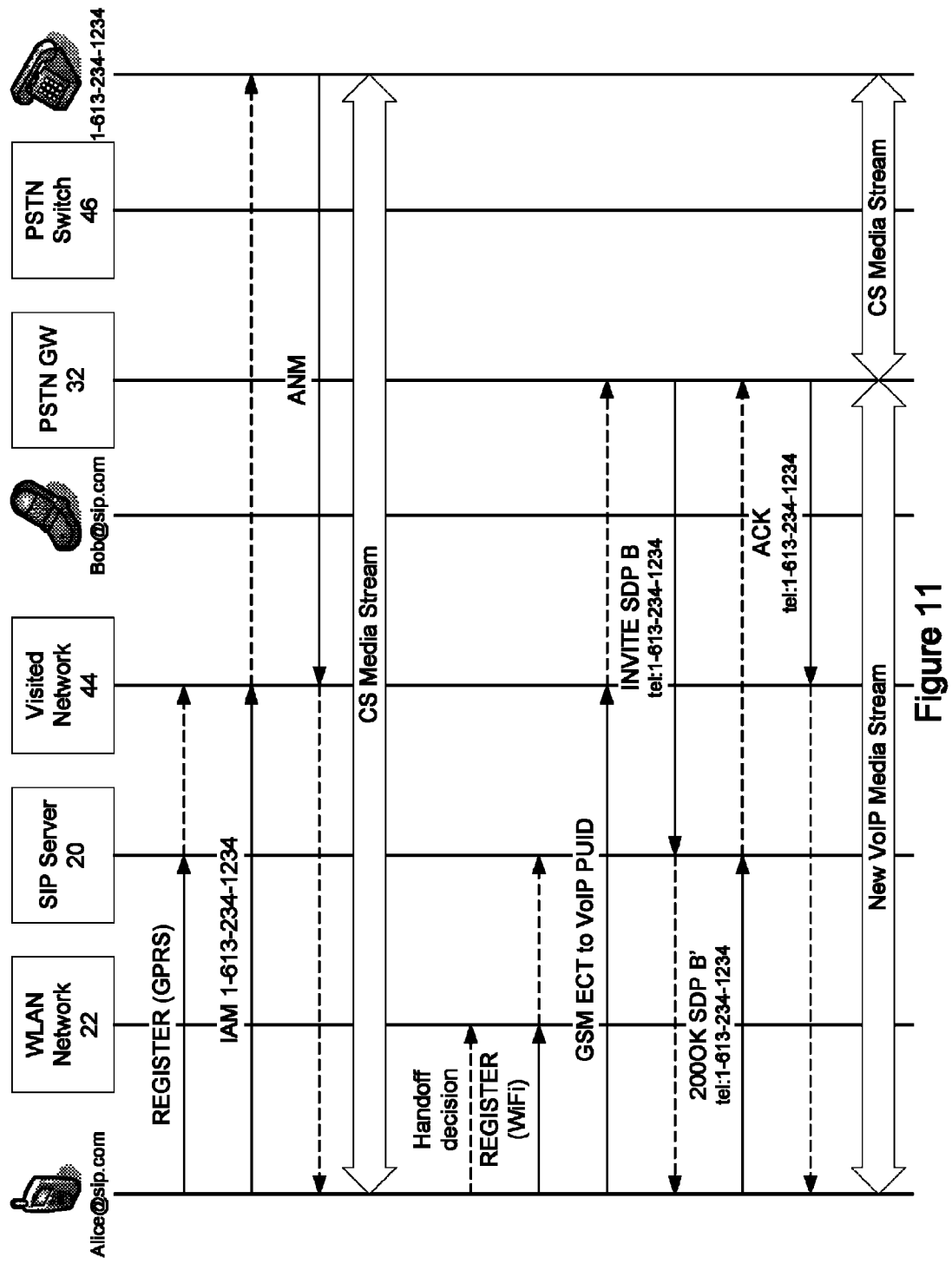
FIG. 11 shows a flow diagram for establishing an outgoing GSM call to a PSTN destination, and subsequent handoff to a WiFi network for a GPRS Class B/C device according to an embodiment of the present invention.

FIG. 11 shows a flow diagram for establishing an outgoing GSM call to a PSTN destination, and subsequent handoff to a WiFi network for a GPRS Class B/C device according to an embodiment of the present invention. When roaming in the visited network 44, Alice can establish a call to a PSTN destination by sending an IAM containing the PSTN destination phone number to the PSTN destination over the visited network 44. The PSTN destination responds with an ANM back through the visited network 44. A CS media stream is thus established for the call. When handoff back to Alice's home WiFi network is indicated, she registers to the WiFi network 22. Alice then invokes GSM ECT to her VoIP PUID through the visited network 44 to the PSTN gateway 32. The PSTN gateway 32 sends Alice an INVITE message containing Alice's phone number, to which she replies with a 200 OK message, to which the PSTN gateway 32 replies with an acknowledgment. A new VoIP media stream is thus established between Alice and the PSTN gateway 32, and the call is handed off and proceeds over the new VoIP media stream and the CS media stream previously established between the PSTN gateway 32 and the PSTN destination.

Figure 12A:
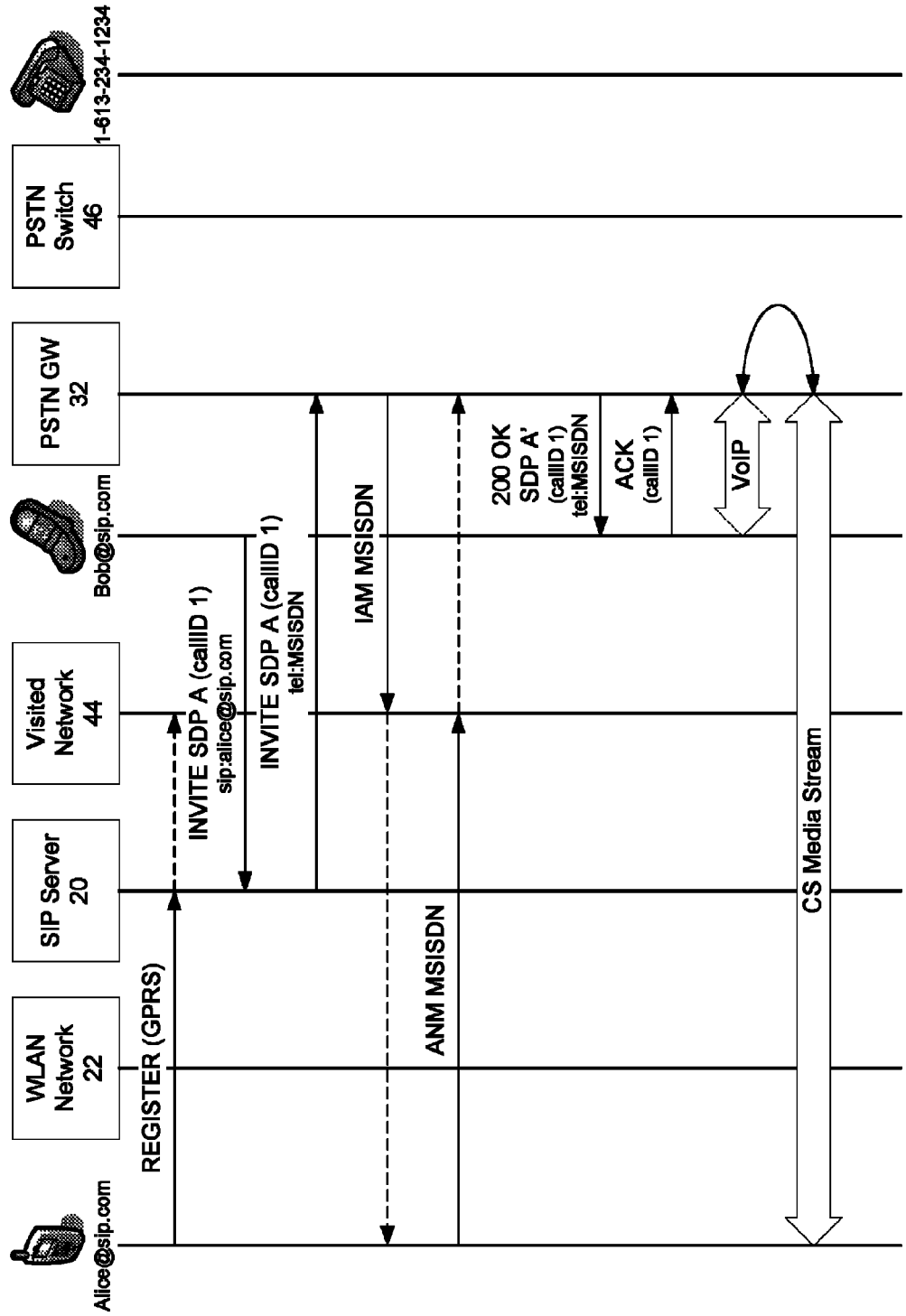
FIGS. 12A and 12B show a flow diagram for establishing an incoming GSM call from a SIP destination, and subsequent handoff to a WiFi network for a GPRS Class B/C device according to an embodiment of the present invention.
Figure 12B:
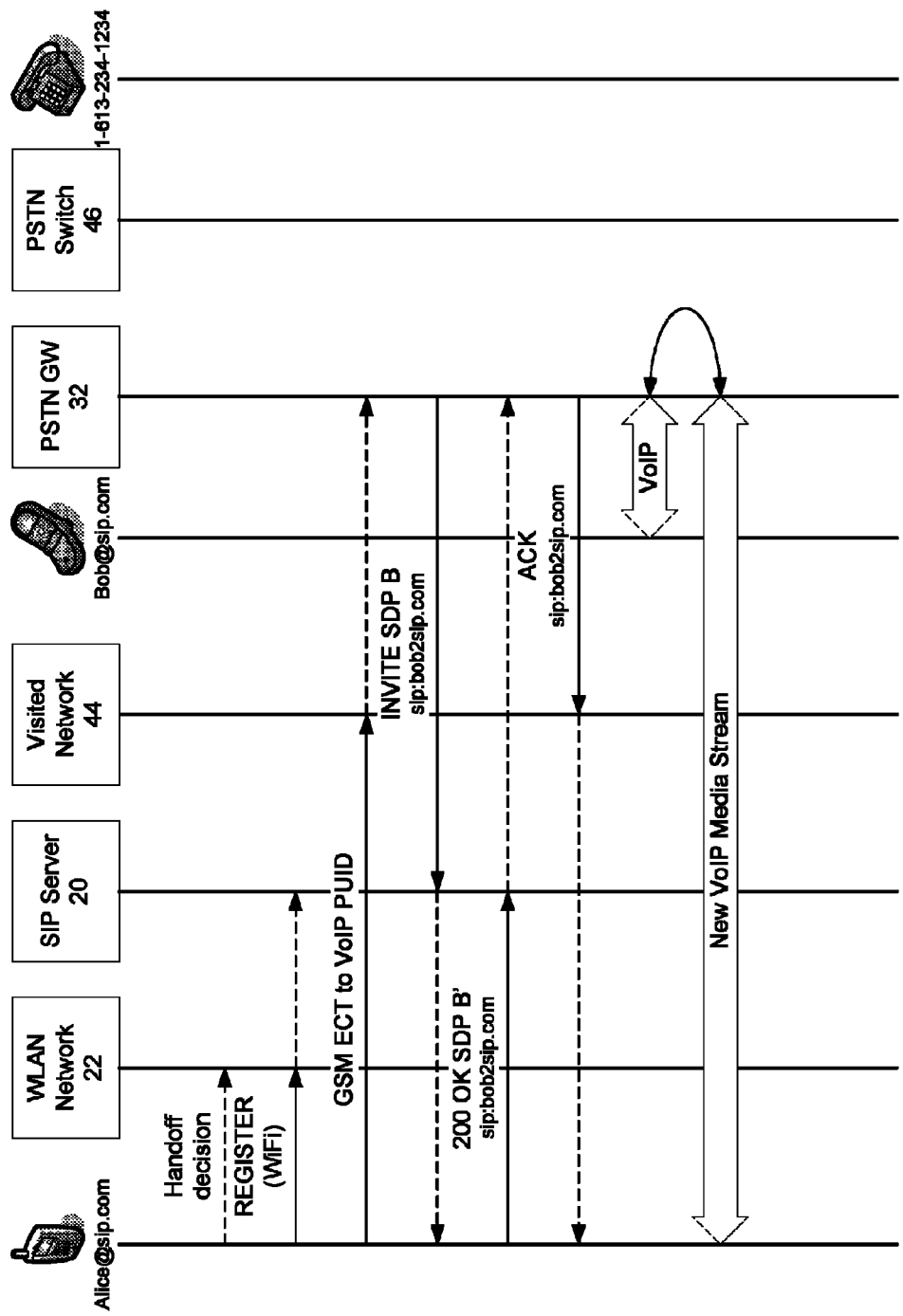

FIGS. 12A and 12B show a flow diagram for establishing an incoming GSM call from a SIP destination, and subsequent handoff to a WiFi network for a GPRS Class B/C device according to an embodiment of the present invention. Alice is roaming within the visited network 44. The call from Bob to Alice is initiated by Bob sending an INVITE containing Alice's VoIP PUID to the SIP server 20. The SIP server 20 then sends an INVITE containing Alice's MSISDN to the PSTN gateway 32. The PSTN gateway 32 then sends a 200 OK message to Bob, which is acknowledged by Bob. A CS media stream and a hairpinning VoIP media stream is thus established between Alice and the PSTN gateway 32, and the PSTN gateway 32 and Bob. When Alice roams within range of the WiFi network, or otherwise determines that a handoff is necessary, Alice registers with the WiFi network. Alice then invokes GSM ECT to her VoIP PUID through the visited network 44 to the PSTN gateway 32. The PSTN gateway 32 sends Alice an INVITE message containing Alice's phone number, to which she replies with a 200 OK message, to which the PSTN gateway 32 replies with an acknowledgment. A new VoIP media stream is thus established between Alice and the PSTN gateway 32, and the call is handed off and proceeds over the new VoIP media stream and the hairpinned VoIP media stream previously established between the gateway 32 and Bob.

Figure 13A:
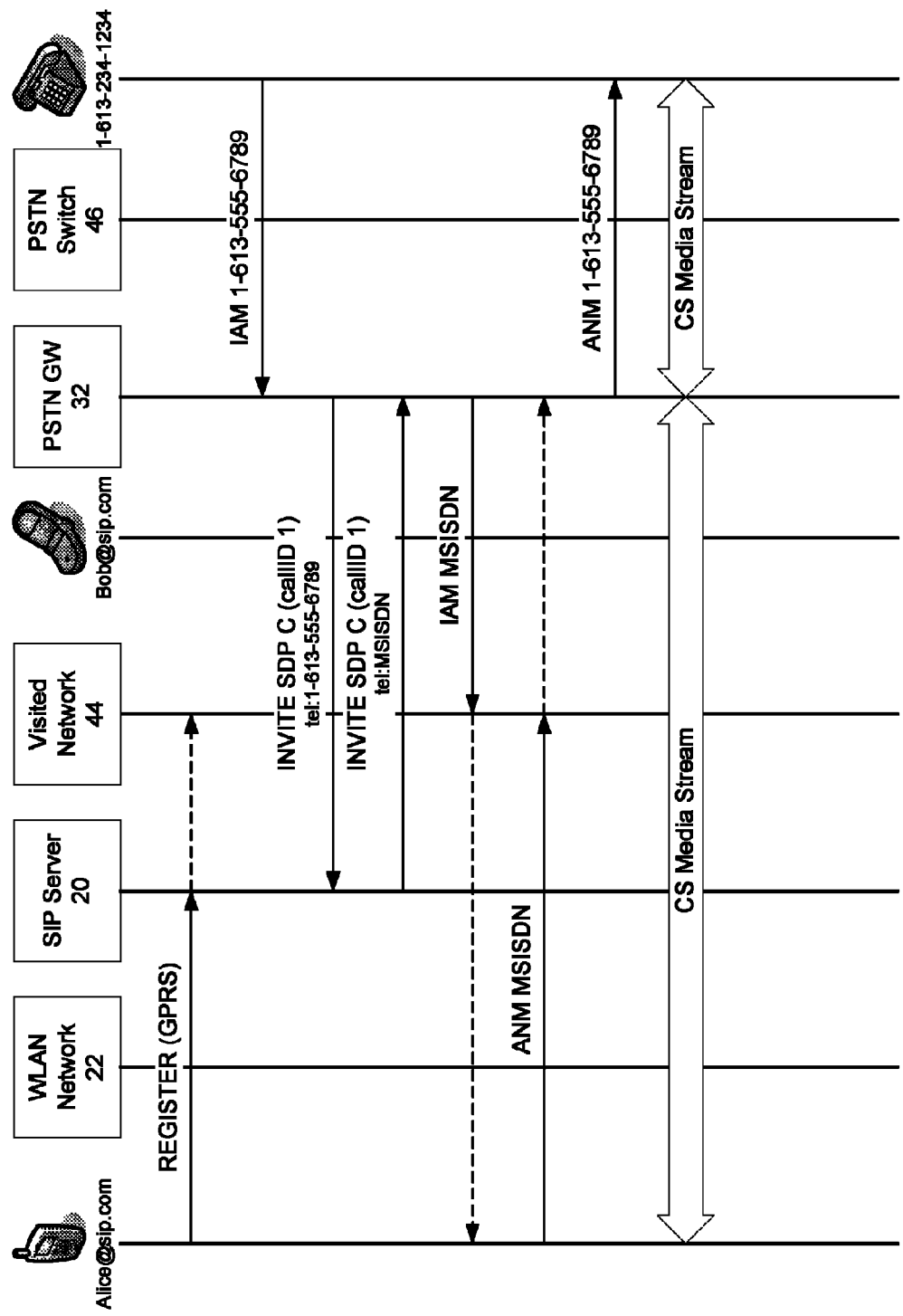
FIGS. 13A and 13B show a flow diagram for establishing an incoming GSM call from a PSTN destination, and subsequent handoff to a WiFi network for a GPRS Class B/C device according to an embodiment of the present invention.
Figure 13B:
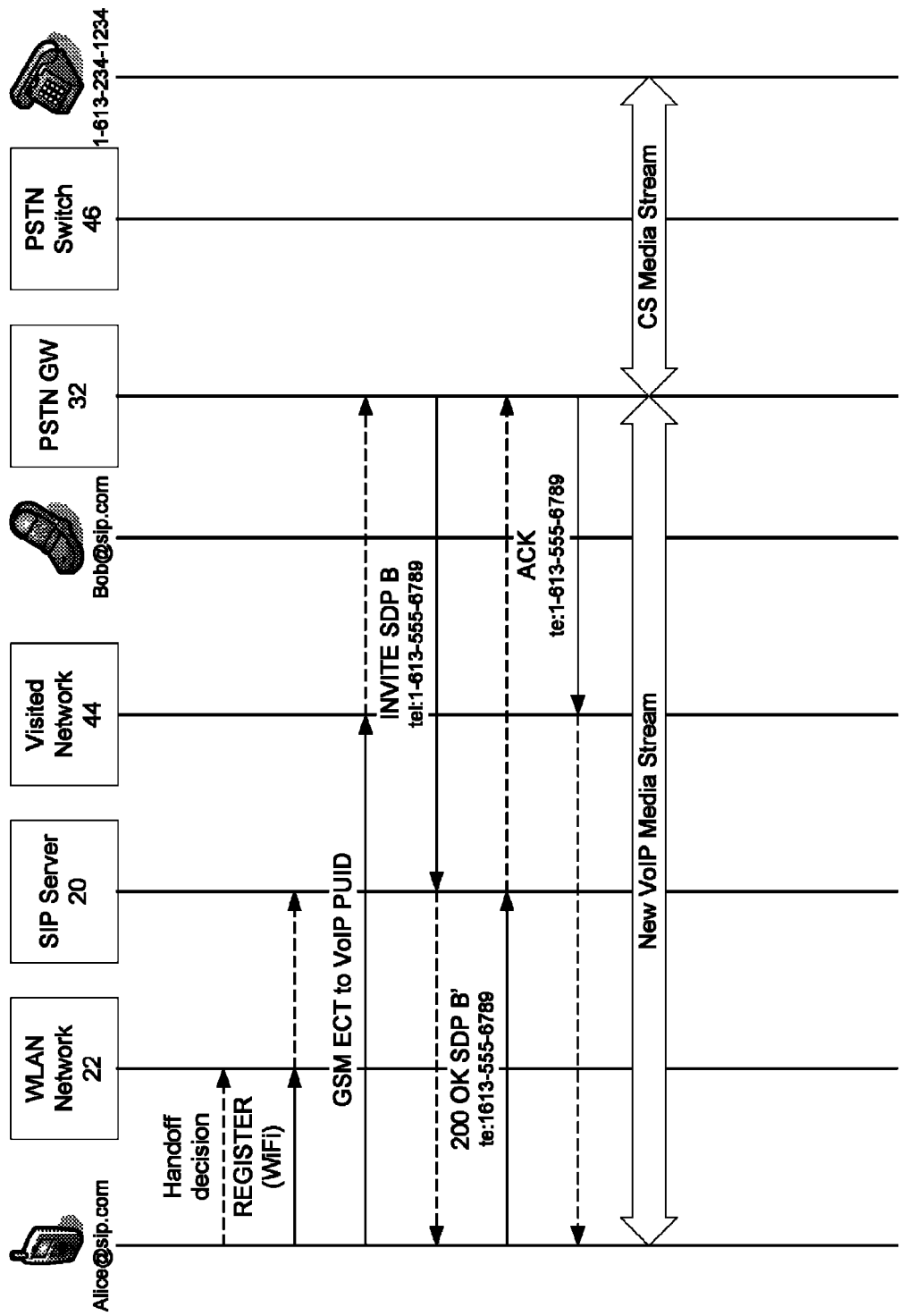

FIGS. 13A and 13B show a flow diagram for establishing an incoming GSM call from a PSTN destination, and subsequent handoff to a WiFi network for a GPRS Class B/C device according to an embodiment of the present invention. To establish the call to Alice in the visited network 44, the PSTN destination device sends an IAM containing Alice's SIP phone number to the PSTN gateway 32. The PSTN gateway 32 translates the message and sends a SIP INVITE to the SIP server 20. The SIP server 20 then sends an INVITE containing Alice's MSISDN to the PSTN gateway 32. The PSTN gateway 32 then sends an IAM containing Alice's MSISDN to the visited network 44 and Alice, and Alice responds with an ANM to the visited network 44 and the PSTN gateway 32. The PSTN gateway 32 then responds to the IAM from the PSTN destination by sending an ANM. This exchange of messages establishes a CS media stream between Alice and the PSTN gateway 32, and a further CS media stream between the PSTN gateway 32 and the PSTN destination. The call from the PSTN destination then proceeds over the communication channel established by the two streams. When Alice roams within range of the WiFi network 22 and determines that handoff is desirable, she registers to the WiFi network and invokes GSM ECT to her VoIP PUID through the visited network 44 to the PSTN gateway 32. The PSTN gateway 32 sends Alice an INVITE message containing Alice's phone number, to which she replies with a 200 OK message, to which the PSTN gateway 32 replies with an acknowledgment. A new VoIP media stream is thus established between Alice and the PSTN gateway 32, and the call proceeds over the new VoIP media stream and the original CS media stream between the PSTN gateway 32 and the PSTN destination.

In the preceding description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for operating a dual-mode mobile communications device to hand off a call between first and second wireless networks operating under different communications protocols, comprising:
    establishing the call over the first wireless network between the dual-mode mobile communications device and a second device thereby setting up an initial communications channel, having at least one media stream, between the dual-mode communications device and the second device;
    operating the dual-mode mobile communications device:
        to detect a handoff condition for handing off the call between the first wireless network and the second wireless network; and
        to directly control, until establishment of at least one new media stream to connect the dual-mode mobile communications device to the second device over the second wireless network, handoff of the call to the second wireless network by executing a standalone client-side application on the dual-mode mobile communications device to solely originate and control an exchange of messages at the application layer, the exchange of messages modifying the communications channel.

2. The method of claim 1, wherein the standalone client-side application originates and controls a sequence of Session Initiation Protocol (SIP) messages.

3. The method of claim 1, wherein the standalone client-side application originates and controls a sequence of ISDN User Part (ISUP) messages.

4. The method of claim 1, wherein the second device is a SIP-enabled device.

5. The method of claim 4, wherein the first wireless network is a WiFi network, the second wireless network is a GSM network, and the initial communications channel comprises a Voice over IP (VoIP) media stream between the dual-mode mobile communications device and the SIP-enabled device, and wherein the modified communications channel comprises a circuit switched (CS) media stream between the dual-mode mobile communications device and a public switched telephone network (PSTN) gateway, and a hairpinned VoIP media stream between the PSTN gateway and the SIP-enabled device.

6. The method of claim 4, wherein the first wireless network is a GSM network, the second wireless network is a WiFi network, and the initial communications channel comprises a CS media stream between the dual-mode mobile communications device and a PSTN gateway and a hairpinning VoIP media stream between the PSTN gateway and the SIP-enabled device, and wherein the modified communications channel comprises a VoIP media stream between the dual-mode mobile communications device and the SIP-enabled device.

7. The method of claim 4, wherein the dual-mode mobile communications device is a class B/C device, the first wireless network is a GSM network, the second wireless network is a WiFi network, and the initial communications channel comprises a CS media stream between the dual-mode mobile communications device and a PSTN gateway and a hairpinned VoIP media stream between the PSTN gateway and the SIP-enabled device, and wherein the modified communications channel comprises a VoIP media stream between the dual-mode mobile communications device and the PSTN gateway, and the hairpinned VoIP media stream between the PSTN gateway and the SIP-enabled device.

8. The method of claim 1, wherein the second device is a PSTN device.

9. The method of claim 8, wherein the first wireless network is a WiFi network, the second wireless network is a GSM network, and the initial communications channel comprises a VoIP media stream between the dual-mode mobile communications device and a public switched telephone network (PSTN) gateway and a CS media stream between the PSTN gateway and the PSTN device, and wherein the modified communications channel comprises a circuit switched (CS) media stream between the dual-mode mobile communications device and the PSTN gateway, and the CS media stream between the PSTN gateway and the PSTN device.

10. The method of claim 8, wherein the first wireless network is a GSM network, the second wireless network is a WiFi network, and the initial communications channel comprises a CS media stream between the dual-mode mobile communications device and a PSTN gateway and a further CS media stream between the PSTN gateway and the PSTN device, and wherein the modified communications channel comprises a VoIP media stream between the dual-mode mobile communications device and the PSTN gateway, and the further CS media stream between the PSTN gateway and the PSTN device.

11. The method of claim 8, wherein the dual-mode mobile communications device is a class B/C device, the first wireless network is a GSM network, the second wireless network is a WiFi network, and the initial communications channel comprises a CS media stream between the dual-mode mobile communications device and a PSTN gateway and a further CS media stream between the PSTN gateway and the PSTN device, and wherein the modified communications channel comprises a VoIP media stream between the dual-mode mobile communications device and the PSTN gateway, and the further CS media stream between the PSTN gateway and the PSTN device.

12. A dual-mode mobile communications device for roaming between first and second wireless networks operating under different communications protocols, wherein a call is established over the first wireless network between the dual-mode mobile communications device and a second device thereby setting up an initial communications channel, having at least one media stream, between the dual-mode mobile communications device and the second device, comprising:
   a processor to execute instructions to enable:
   a roaming agent to detect a handoff condition for handing off the call between the first wireless network and the second wireless network; and
   a handoff agent to directly control, until establishment of at least one new media stream to connect the dual-mode mobile communications device to the second device over the second wireless network, handoff of the call to the second wireless network by originating and controlling an exchange of messages at the application layer, the exchange of messages modifying the communications channel.

13. A dual-mode mobile communications device of claim 12, wherein the handoff agent originates and controls a sequence of Session Initiation Protocol (SIP) messages.

14. A dual-mode mobile communications device of claim 12, wherein the handoff agent originates and controls a sequence of ISDN User Part (ISUP) messages.

15. A dual-mode mobile communications device of claim 12, wherein the second device is a SIP-enabled device.

16. A dual-mode mobile communications device of claim 15, wherein the first wireless network is a WiFi network, the second wireless network is a GSM network, and the initial communications channel comprises a Voice over IP (VoIP) media stream between the dual-mode mobile communications device and the SIP-enabled device, and wherein the modified communications channel comprises a circuit switched (CS) media stream between the dual-mode mobile communications device and a public switched telephone network (PSTN) gateway, and a hairpinned VoIP media stream between the PSTN gateway and the SIP-enabled device.

17. A dual-mode mobile communications device of claim 15, wherein the first wireless network is a GSM network, the second wireless network is a WiFi network, and the initial communications channel comprises a CS media stream between the dual-mode mobile communications device and a PSTN gateway and a hairpinning VoIP media stream between the PSTN gateway and the SIP-enabled device, and wherein the modified communications channel comprises a VoIP media stream between the dual-mode mobile communications device and the SIP-enabled device.

18. A dual-mode mobile communications device of claim 15, wherein the dual-mode mobile communications device is a class B/C device, the first wireless network is a GSM network, the second wireless network is a WiFi network, and the initial communications channel comprises a CS media stream between the dual-mode mobile communications device and a PSTN gateway and a hairpinned VoIP media stream between the PSTN gateway and the SIP-enabled device, and wherein the modified communications channel comprises a VoIP media stream between the dual-mode mobile communications device and the PSTN gateway, and the hairpinned VoIP media stream between the PSTN gateway and the SIP-enabled device.

19. The dual-mode mobile communications device of claim 12, wherein the second device is a PSTN device.

20. A dual-mode mobile communications device of claim 19, wherein the first wireless network is a WiFi network, the second wireless network is a GSM network, and the initial communications channel comprises a VoIP media stream between the dual-mode mobile communications device and a public switched telephone network (PSTN) gateway and a CS media stream between the PSTN gateway and the PSTN device, and wherein the modified communications channel comprises a circuit switched (CS) media stream between the dual-mode mobile communications device and the PSTN gateway, and the CS media stream between the PSTN gateway and the PSTN device.

21. A dual-mode mobile communications device of claim 19, wherein the first wireless network is a GSM network, the second wireless network is a WiFi network, and the initial communications channel comprises a CS media stream between the dual-mode mobile communications device and a PSTN gateway and a further CS media stream between the PSTN gateway and the PSTN device, and wherein the modified communications channel comprises a VoIP media stream between the dual-mode mobile communications device and the PSTN gateway, and the further CS media stream between the PSTN gateway and the PSTN device.

22. A dual-mode mobile communications device of claim 19, wherein the dual-mode mobile communications device is a class B/C device, the first wireless network is a GSM network, the second wireless network is a WiFi network, and the initial communications channel comprises a CS media stream between the dual-mode mobile communications device and a PSTN gateway and a further CS media stream between the PSTN gateway and the PSTN device, and wherein the modified communications channel comprises a VoIP media stream between the dual-mode mobile communications device and the PSTN gateway, and the further CS media stream between the PSTN gateway and the PSTN device.

* * * * *

UNITED STATES PATENT AND TRADEMARK OFFICE
CERTIFICATE OF CORRECTION

PATENT NO. : 8,184,590 B2  
APPLICATION NO. : 11/832928  
DATED : May 22, 2012  
INVENTOR(S) : Ariel Rosenblatt Page 1 of 1

It is certified that error appears in the above-identified patent and that said Letters Patent is hereby corrected as shown below:

In the Claims

Column 15, Claim 12, Line 40, delete "by originating" and insert -- by solely originating -- therefor Signed and Sealed this
Nineteenth Day of November, 2013

Teresa Stanek Rea
*Deputy Director of the United States Patent and Trademark Office*